(12) United States Patent
Wernerehl et al.

(10) Patent No.: US 11,590,493 B2
(45) Date of Patent: Feb. 28, 2023

(54) ASSAY DEVICES AND METHODS OF MANUFACTURE

(71) Applicant: bioMerieux, Inc., Durham, NC (US)

(72) Inventors: Aaron Wernerehl, Salt Lake City, UT (US); Jonathan A. Bruns, Salt Lake City, UT (US); Jonathan B. Derrick, Draper, UT (US); Taylor S. Zimmerman, West Valley City, UT (US); David E. Jones, Layton, UT (US)

(73) Assignee: bioMerieux, Inc., Durham, NC (US)

( * ) Notice: Subject to any disclaimer, the term of this patent is extended or adjusted under 35 U.S.C. 154(b) by 0 days.

(21) Appl. No.: 17/771,965

(22) PCT Filed: Oct. 28, 2020

(86) PCT No.: PCT/US2020/057600
§ 371 (c)(1),
(2) Date: Apr. 26, 2022

(87) PCT Pub. No.: WO2021/086878
PCT Pub. Date: May 6, 2021

(65) Prior Publication Data
US 2022/0347680 A1    Nov. 3, 2022

Related U.S. Application Data

(60) Provisional application No. 62/927,481, filed on Oct. 29, 2019.

(51) Int. Cl.
| | |
|---|---|
| B29D 22/00 | (2006.01) |
| B01L 3/00 | (2006.01) |
| B01L 7/00 | (2006.01) |
| B29K 105/00 | (2006.01) |

(52) U.S. Cl.
CPC .......... *B01L 3/502707* (2013.01); *B01L 7/52* (2013.01); *B29D 22/00* (2013.01); *B01L 2200/16* (2013.01); *B01L 2300/0887* (2013.01); *B01L 2300/18* (2013.01); *B01L 2400/0683* (2013.01); *B29K 2105/256* (2013.01)

(58) Field of Classification Search
CPC . B01L 3/502707; B01L 3/5027; B29D 22/00; B29K 2105/256
See application file for complete search history.

(56) References Cited

U.S. PATENT DOCUMENTS

| | | | |
|---|---|---|---|
| 6,293,012 B1 * | 9/2001 | Moles | ................ F16K 99/0015 29/890.132 |
| 6,318,191 B1 | 11/2001 | Chen | |
| 2009/0263782 A1 | 10/2009 | Ward et al. | |
| 2010/0317093 A1 | 12/2010 | Turewicz et al. | |
| 2016/0288120 A1 | 10/2016 | Song et al. | |
| 2019/0270267 A1 * | 9/2019 | Hopkins | ................ A43B 13/20 |

OTHER PUBLICATIONS

'Blow Molding', CustomPart.net, 2008 [retrieved from the internet on Feb. 8, 2021 (Feb. 8, 2021) at <https://www.custompartnet.com/wu/blow-molding>] p. 1 figure.
International Search Report and Written Opinion corresponding to International Patent Application No. PCT/US2020/057600, dated Mar. 3, 2021.

* cited by examiner

*Primary Examiner* — Brian J. Sines
(74) *Attorney, Agent, or Firm* — Myers Bigel, P.A.

(57) ABSTRACT

Systems, methods, and apparatuses are provided for self-contained nucleic acid preparation, amplification, and analysis.

25 Claims, 15 Drawing Sheets

ASSAY DEVICES AND METHODS OF MANUFACTURE

CROSS REFERENCE TO RELATED APPLICATIONS

This application is a 35 U.S.C. § 371 national phase application of International Application Serial No. PCT/US2020/057600, filed Oct. 28, 2020, which claims the benefit of and priority to U.S. Prov. Pat. App. No. 62/927,481 filed 29 Oct. 2019, which are each incorporated herein by reference in their entirety. This application also references French Patent Application FR1912110 filed 29 Oct. 2019, the entirety of which is incorporated herein by reference.

BACKGROUND

1. Technical Field

Embodiments of the present disclosure relate generally to test devices, for example, for amplifying nucleic acids and methods of manufacture of such test devices.

2. Background

In the United States, Canada, and Western Europe infectious disease accounts for approximately 7% of human mortality, while in developing regions infectious disease accounts for over 40% of human mortality. Infectious diseases lead to a variety of clinical manifestations. Among common overt manifestations are fever, pneumonia, meningitis, diarrhea, and diarrhea containing blood. While the physical manifestations suggest some pathogens and eliminate others as the etiological agent, a variety of potential causative agents remain, and clear diagnosis often requires a variety of assays be performed. Traditional microbiology techniques for diagnosing pathogens can take days or weeks, often delaying a proper course of treatment.

In recent years, the polymerase chain reaction (PCR) has become a method of choice for rapid diagnosis of infectious agents. PCR can be a rapid, sensitive, and specific tool to diagnose infectious disease. However, a challenge to using PCR as a primary means of diagnosis is the variety of possible causative organisms or viruses and the low levels of organism or virus present in some pathological specimens. It is often impractical to run large panels of PCR assays, one for each possible causative organism or viruses, most of which are expected to be negative. The problem is exacerbated when pathogen nucleic acid is at low concentration and requires a large volume of sample to gather adequate reaction templates. In some cases there is inadequate sample to assay for all possible etiological agents. A solution is to run "multiplex PCR" wherein the sample is concurrently assayed for multiple targets in a single reaction. While multiplex PCR has proved to be valuable in some systems, shortcomings exist concerning robustness of high level multiplex reactions and difficulties for clear analysis of multiple products. To solve these problems, the assay may be subsequently divided into multiple secondary PCRs. Nesting secondary reactions within the primary product increases robustness. Closed systems such as the FilmArray® (BioFire Diagnostics, LLC, Salt Lake City, Utah) reduce handling, thereby diminishing contamination risk.

The present invention addresses various improvements relating to automated or semi-automated manufacturing of test devices, cost of test devices, and more rapid sample-to-answer.

BRIEF SUMMARY

Described herein are self-contained reaction containers (also referred to herein as 'pouches' or 'cards'), methods of manufacturing such reaction containers, instruments, systems, and methods for rapid amplification of nucleic acids. In an illustrative embodiment, a reaction container may be fabricated from a first sheet and a second sheet of polymeric material with one or more fluidically connected reaction chambers and reagent reservoirs (e.g., aqueous reagent reservoirs) formed between the first and second sheets. The reaction chambers and reagent reservoirs may be formed by pressing the first and second polymeric sheets between forming plates and propelling a compressed fluid between the sheets to form open areas.

Described herein are:

A1. A method for forming a reaction container, comprising:

providing a polymeric sheet that comprises an inner planar face and an outer planar face;

contacting a first inner planar face of the polymeric sheet to a second inner planar face of the polymeric sheet;

pressing the polymeric sheet between a first forming plate and a second forming plate, wherein at least one of the first or second forming plates has one or more recesses for forming one or more features selected from the group consisting of a reaction chamber, a fluid flow channel, a reagent chamber, or a sample chamber in selected portions of the polymeric sheet;

propelling a compressed fluid between the inner planar faces of the polymeric sheet while the polymeric sheet is pressed between the forming plates to reform the selected portions of the polymeric sheet into a shape defined by the one or more recesses of the forming plates;

separating the first forming plate and the second forming plate so the polymeric sheet is no longer pressed between the first and second forming plates; and removing the reaction container from between the first forming plate and the second forming plate.

A2. The method of clause A1, wherein the provided polymeric sheet comprises a first polymeric sheet and a second polymeric sheet, each polymeric sheet having an inner planar face and an outer planar face, and the method further comprising:

arranging the first and second polymeric sheets so that the inner planar faces are arranged adjacent to one another, performing the pressing step, and propelling a compressed fluid between the two polymeric sheets while the two polymeric sheets are pressed between the forming plates to reform the selected portions into a shape defined by the one or more recesses of the forming plates.

A3. The method of any of clauses A1 or A2 further comprising heating the polymeric sheet to a softening temperature prior to the pressing step, performing the pressing and propelling steps, and cooling the polymeric sheet after the propelling step to set the shape defined by the one or more recesses of the forming plates.

A4. The method of any of clauses A1-A3, wherein the polymeric sheet comprises a flexible polymeric material having a thickness in a range of about 0.02 mm to about 0.1 mm.

A5. The method of any of clauses A1-A4, wherein the flexible polymeric material is selected from the group consisting of polyester, polyethylene, polyethylene terephthalate (PET), polycarbonate, polypropylene (PP), polymethylmethacrylate, mixtures, combinations thereof.

A6. The method of any of clauses A1-A5, wherein the flexible polymeric material comprises a water vapor and/or oxygen barrier material.

A7. The method of any of clauses A1-A6, wherein the polymeric material has a water vapor transmission rate (WVTR) in a range of about 0.01 $g/m^2/24$ hrs to about 3 $g/m^2/24$ hrs, preferably in a range of about 0.05 $g/m^2/24$ hrs to about 2 $g/m^2/24$ hrs, or more preferably no more than about 1 $g/m^2/24$ hrs, and an oxygen transmission rate in a range of about 0.01 $cc/m^2/24$ hrs to about 2 $cc/m^2/24$ hrs, preferably in a range of about 0.05 $cc/m^2/24$ hrs to about 2 $cc/m^2/24$ hrs, or more preferably no more than about 1 $cc/m^2/24$ hrs.

A8. The method of any of clauses A1-A7, wherein the flexible polymeric material comprises two or more layers of film material bonded together and the water vapor and/or oxygen barrier comprises at least one of a metalized or ceramic-coated film layer.

A9. The method of any of clauses A1-A8, wherein the selected portions comprise one or more of a sample input chamber, a sample preparation chamber, a sample reactant recovery/wash chamber, a reaction chamber, or one or more fluid reagent reservoirs.

A10. The method of any of clauses A1-A9, further comprising heating the polymeric sheet to a first temperature prior to the pressing step.

A11. The method of any of clauses A1-A10, wherein separating the first forming plate and the second forming plate comprises moving at least one of the first forming plate and the second forming plate.

A12. The method of any of clauses A1-A11, wherein separating the first forming plate and the second forming plate comprises moving only one of the first forming plate and the second forming plate.

B1. A method for forming a reaction container, comprising:

providing a first polymeric sheet and a second polymeric sheet, wherein the first and second polymeric sheets each comprise an inner planar face and an outer planar face;

contacting the inner planar face of the first polymeric sheet to the inner planar face of the second polymeric sheet;

laminating the first polymeric sheet to the second polymeric sheet;

making one or more seal lines joining the first and second polymeric sheets;

pressing the first and second polymeric sheets between a first forming plate and a second forming plate, wherein at least one of the first or second forming plates has one or more recesses positioned for reforming the first and second polymeric sheets to form one or more openings in a region defined by the one or more seal lines;

expanding selected areas of the first and second polymeric sheets into a shape defined by the one or more recesses of the forming plates by blowing a compressed gas between the first and second polymeric sheets while the first and second polymeric sheets are pressed between the forming plates;

separating the first forming plate and the second forming plate; and removing the reaction container from between the first forming plate and the second forming plate.

B2. The method of clause B1, further comprising cooling the first and second polymeric sheets subsequent to the expanding step to set the shape defined by the one or more recesses of the forming plates.

B3. The method of any of clauses B1 or B2, wherein the compressed gas blown between the first and second polymeric sheets substantially simultaneously expands and cools the first and second polymeric sheets.

B4. The method of any of clauses B1-B3, wherein making the one or more seal lines comprises defining one or more of a sample input chamber, a sample preparation chamber, a sample reactant recovery/wash chamber, at least one reaction chamber, a one or more fluid reagent reservoirs, or one or more channels fluidically connecting the sample input chamber, the sample preparation chamber, the sample reactant recovery/wash chamber, the at least one reaction chamber, and the one or more reagent reservoirs.

B5. The method of any of clauses B1-B4, wherein when the first and second polymeric sheets are pressed between a first forming plate and a second forming plate the one or more recesses of the forming plates substantially align with the one or more areas defined by the seal lines, and the selected areas expanded by blowing a compressed gas between the first and second polymeric sheets comprise one or more of the sample input chamber, the sample preparation chamber, the recovery/wash chamber, one or more reaction chambers, or one or more reagent reservoirs, and wherein one or more of the selected areas expanded by blowing the compressed gas between the first and second polymeric sheets are connected by one or more sealed, openable laminated channels.

B6. The method of any of clauses B1-B5, wherein the reaction container comprises sample input chamber fluidically connected to a first reaction chamber, a second reaction chamber fluidically connected to the first reaction chamber, and at least one reagent reservoir fluidically connected to the sample input chamber, the first reaction chamber, or the second reaction chamber, and wherein the method further comprises:

expanding the sample input chamber and the at least one reagent reservoir into shapes defined by the recesses of the forming plates by blowing the compressed gas between the first and second polymeric sheets while the first and second polymeric sheets are pressed between the forming plates.

B7. The method of any of clauses B1-B6, further comprising expanding the second reaction chamber into a shape defined by the recesses of the forming plates by blowing the compressed gas between the first and second polymeric sheets while the first and second polymeric sheets are pressed between the forming plates.

B8. The method of any of clauses B1-B7, further comprising:

making the one or more seal lines defining a second reaction chamber, expanding the second reaction chamber into a shape defined by a second reaction chamber recess of the forming plates, providing a reaction card having a plurality of wells formed therein and spotted with one or more dried reagents for a second stage reaction, inserting the reaction card into the second reaction chamber via an opening between the first and second sheets;

bonding a first planar face of the reaction card to the first sheet and a second, opposite planar face of the reaction card to the second sheet, and sealing the opening used to insert the reaction card by sealing the first polymeric sheet to the second polymeric sheet at the opening.

B9. The method of any of clauses B1-B8, further comprising:

injecting a selected aqueous reagent into the at least one reagent reservoir via a reagent reservoir opening between the first and second polymeric sheets, sealing the selected aqueous reagent in the at least one reagent reservoir by sealing the first polymeric sheet to the second polymeric sheet at the reagent reservoir opening such that the reaction container is provided with an aqueous reagent at the time of manufacture.

B10. The method of any of clauses B1-B9, further comprising:

expanding a fluid reservoir and an access channel in the first reaction chamber into shapes defined by the recesses of the forming plates by blowing the compressed gas between the first and second polymeric sheets while the first and second polymeric sheets are pressed between the forming plates, injecting an aqueous reagent into the fluid reservoir in the first reaction chamber via the access channel, and sealing the sample preparation reagent in the fluid reservoir in the sample preparation chamber by sealing the first polymeric sheet to the second polymeric sheet at the access channel such that the reaction container is provided with the aqueous reagent in the first reaction chamber at the time of manufacture.

B11. The method of any of clauses B1-B10, wherein the first and second polymeric sheets comprise a water vapor and/or oxygen barrier material.

B12. The method of any of clauses B1-B11, wherein the first and second polymeric sheets have a water vapor transmission rate (WVTR) in a range of about 0.01 $g/m^2/24$ hrs to about 3 $g/m^2/24$ hrs, preferably in a range of about 0.05 $g/m^2/24$ hrs to about 2 $g/m^2/24$ hrs, or more preferably no more than about 1 $g/m^2/24$ hrs, and/or an oxygen transmission rate in a range of about 0.01 $cc/m^2/24$ hrs to about 2 $cc/m^2/24$ hrs, preferably in a range of about 0.05 $cc/m^2/24$ hrs to about 2 $cc/m^2/24$ hrs, or more preferably no more than about 1 $cc/m^2/24$ hrs.

B13. The method of any of clauses B1-B12, wherein the water vapor and/or oxygen barrier material comprises at least one of a metalized or ceramic-coated film layer.

B14. The method of any of clauses B1-B13, wherein the first and second polymeric sheets comprise a material selected from the group consisting of polyester, polyethylene, polyethylene terephthalate (PET), polycarbonate, polypropylene (PP), polymethylmethacrylate, mixtures, combinations thereof.

B15. The method of any of clauses B1-B14, further comprising:

prior to the laminating step, dispensing droplets of one or more liquid reagents onto the first polymeric sheet or the second polymeric sheet and drying the droplets of liquid reagent dispensed onto the first polymeric sheet or the second polymeric sheet, wherein the droplets of the one or more liquid reagents are dispensed and dried in one or more areas to be formed into the sample input chamber, the sample preparation chamber, the sample reactant recovery/wash chamber, the at least one reaction chamber, or the one or more channels fluidically connecting the sample input chamber, the sample preparation chamber, the sample reactant recovery/wash chamber, the at least one reaction chamber, and the one or more reagent reservoirs.

B16. The method of any of clauses B1-B15, further comprising heating the first and second polymeric sheets to a temperature sufficient for reforming first and second polymeric sheets prior to the pressing step.

B17. The method of any of clauses B1-B16, wherein separating the first forming plate and the second forming plate comprises moving at least one of the first forming plate and the second forming plate.

B18. The method of any of clauses B1-B17, wherein separating the first forming plate and the second forming plate comprises moving only one of the first forming plate and the second forming plate.

C1. A method for forming a reaction container formed from a first sheet and a second sheet and having a first reaction chamber, a reagent reservoir, and a channel fluidically connecting the reaction chamber and the reagent reservoir, the method comprising:

laminating the first sheet to the second sheet;

making one or more seal lines joining the first and second sheets to define the first reaction chamber, the reagent reservoir, and the channel;

pressing the first and second sheets between a forming die having a first plate and a second plate, wherein the forming die comprises recesses having a shape corresponding to the reagent reservoir;

propelling a fluid between the first and second sheets while the first and second sheets are clamped in the forming die to reform selected areas of the first and second sheets into the shapes of the recesses; and removing the reaction container from the forming die.

C2. The method of clause C1, further comprising injecting an aqueous reagent into the reagent reservoir via a first reagent reservoir opening between the first and second sheets, sealing the aqueous reagent in the reagent reservoir by sealing the first reagent reservoir opening such that the reaction container is provided with an aqueous reagent at the time of manufacture.

C3. The method of any of clauses C1 or C2, wherein the reaction container further comprises a second reaction chamber fluidly connected to the first reaction chamber by a second channel, the method further comprising:

making the one or more seal lines to join the first and second sheets to define the first reaction chamber, the reagent reservoir, the first channel, the second reaction chamber, and the second channel, and performing the clamping and propelling steps to selectively to form the reagent reservoir and the second reaction chamber, wherein the forming die further comprises a recess having a shape corresponding to the second reaction chamber.

C4. The method of any of clauses C1-C3, further comprising:

providing a reaction card having a plurality of wells formed therein and spotted with one or more dried reagents for a second stage reaction, inserting the reaction card into the second reaction chamber via a second reaction chamber opening between the first and second sheets;

bonding a first planar face of the reaction card to the first sheet and a second, opposite planar face of the reaction card to the second sheet, and sealing the second reaction chamber opening.

C5. The method of any of clauses C1-C4, wherein the reaction container further comprises a sample input chamber, a sample preparation chamber, and a sample reactant recovery/wash chamber, upstream of first reaction chamber and a plurality of channels fluidly connecting the sample input chamber, the sample preparation chamber, and the sample reactant recovery/wash chamber to the first reaction chamber, the method further comprising:

making the one or more seal lines to join the first and second sheets to additionally define each of the sample input chamber, the sample preparation chamber, the sample reactant recovery/wash chamber, and the plurality of channels, performing the clamping and propelling steps to additionally form the sample input chamber, the sample preparation chamber, and the sample reactant recovery/wash chamber, wherein the forming die further comprises recesses having shapes corresponding to the sample input chamber and the sample reactant recovery/wash chamber.

C6. The method of any of clauses C1-05, wherein the forming die further comprises recesses positioned and configured for forming a plurality of reagent reservoirs fluidly connected to the sample preparation chamber, the sample reactant recovery/wash chamber, and the first reaction chamber, and the method further comprising:

making the one or more seal lines to join the first and second sheets to additionally define each of the plurality of reagent reservoirs and a plurality of channels fluidically connecting them to one or more of the sample input chamber, the sample preparation chamber, the sample reactant recovery/wash chamber, the first reaction chamber, or the second reaction chamber;

performing the clamping and propelling steps to additionally form each of the plurality of reagent reservoirs, injecting a selected aqueous reagent into each of the plurality of reagent reservoirs via a plurality of reagent reservoir opening between the first and second sheets, sealing the aqueous reagents in each of the plurality of reagent reservoirs by sealing the openings such that the reaction container is provided with a plurality of aqueous reagents at the time of manufacture.

C7. The method of any of clauses C1-C6, wherein the forming die further comprises a recess having a shape corresponding to a fluid reservoir positioned in the sample preparation chamber, and the method further comprising:

performing the clamping and propelling steps to form the fluid reservoir in the sample preparation chamber, injecting a sample preparation reagent into the fluid reservoir via a sample preparation chamber opening between the first and second sheets, and sealing the sample preparation reagent in the fluid reservoir in the sample preparation chamber by sealing the sample preparation chamber opening such that the reaction container is provided with sample preparation reagent at the time of manufacture.

C8. The method of any of clauses C1-C7, wherein the first sheet to the second sheet comprise a flexible polymeric material.

C9. The method of any of clauses C1-C8, wherein the flexible polymeric material comprises a water vapor and/or oxygen barrier material.

C10. The method of any of clauses C1-C9, wherein the polymeric material comprising the water vapor and/or oxygen barrier material has a water vapor transmission rate (WVTR) in a range of about 0.01 $g/m^2/24$ hrs to about 3 $g/m^2/24$ hrs, preferably in a range of about 0.05 $g/m^2/24$ hrs to about 2 $g/m^2/24$ hrs, or more preferably no more than about 1 $g/m^2/24$ hrs, and an oxygen transmission rate in a range of about 0.01 $cc/m^2/24$ hrs to about 2 $cc/m^2/24$ hrs, preferably in a range of about 0.05 $cc/m^2/24$ hrs to about 2 $cc/m^2/24$ hrs, or more preferably no more than about 1 $cc/m^2/24$ hrs.

C11. The method of any of clauses C1-C10, wherein the polymeric material is selected from the group consisting of polyester, polyethylene, polyethylene terephthalate (PET), polycarbonate, polypropylene (PP), polymethylmethacrylate, mixtures, combinations thereof.

C12. The method of any of clauses C1-C11, wherein the water vapor and/or oxygen barrier material comprises at least one of a metalized or ceramic-coated film layer.

C13. The method of any of clauses C1-C12, wherein making the one or more seal lines to join the first and second sheets to define the reaction chamber, the reagent blister, and the channel comprises one or more of heat sealing, sonic welding, or laser welding.

C14. The method of any of clauses C1-C13, wherein the first and second sheets are heated prior to the clamping step.

C15. The method of any of clauses C1-C14, wherein the heating comprises selectively heating only regions of the first and second sheets defining the reaction chamber and the reagent blister.

C16. The method of any of clauses C1-C15, wherein selectively heating comprises clamping the first and second sheets in between heated plates having raised areas corresponding to the reaction chamber and the reagent blister.

C17. The method of any of clauses C1-C16, wherein the fluid propelled between the first and second sheets is compressed air.

C18. The method of any of clauses C1-C17, further comprising forming one or more holes in the first sheet or the second sheet and one or more channels in fluid communication with the one or more holes, wherein the one or more holes are in fluid communication with corresponding conduits in the forming die for propelling the fluid between the first and second sheets to form the reaction chamber and the reagent blister.

C19. The method of any of clauses C1-C18, wherein the one or more holes in the first sheet or the second sheet are clamped in the forming die in fluid communication with the conduits for propelling the fluid between the first and second sheets.

C20. The method of any of clauses C1-C19, wherein removing the reaction container from the forming die comprises separating the first forming plate and the second forming plate so the first and second sheets are no longer clamped in the forming die.

C21. The method of any of clauses C1-C20, wherein separating the first forming plate and the second forming plate comprises moving at least one of the first forming plate and the second forming plate.

C22. The method of any of clauses C1-C21, wherein separating the first forming plate and the second forming plate comprises moving only one of the first forming plate and the second forming plate.

C23. The method of any of clauses C1-C22, wherein the one or more holes are in the first sheet only and the conduits are not in fluid communication with any holes in the second sheet.

D1. A method for forming a reaction container formed from a first sheet and a second sheet and having a reaction chamber, a reagent reservoir, a channel fluidically connecting the reaction chamber and the reagent reservoir, and one or more dried reagents disposed in the reaction container between the first sheet and the second sheet, the method comprising:

dispensing one or more liquid reagents onto the first sheet or the second sheet;

drying the liquid reagents dispensed onto the first sheet or the second sheet;

laminating the first sheet to the second sheet, wherein the laminating includes heating the first and second sheets and compressing them, and wherein the laminated first and second sheets are reversibly sealed to one another;

forming one or more seal lines substantially irreversibly bonding the first and second sheets together at the seal lines to define the reaction chamber, the reagent reservoir, and the channel;

clamping the first and second sheets in a forming die having a first plate and a second plate, wherein the forming die comprises a recess having a shape corresponding to the reagent reservoir;

propelling a fluid between the first and second sheets while the first and second sheets are clamped in the forming die to reform selected areas of the first and second sheets into the shapes of the recesses; and removing the reaction container from the forming die.

D2. The method of clause D1, wherein the liquid reagents are dispensed onto the first or second sheet as droplets.

D3. The method of any of clauses D1 or D2, wherein the liquid reagents are water-based.

D4. The method of any of clauses D1-D3, wherein the liquid reagents are air dried on the first or second sheet prior to the laminating.

D5. The method of any of clauses D1-D4, wherein the one or more liquid reagents are dispensed onto the first or second sheet and dried in a region to be formed into the reaction chamber.

D6. The method of any of clauses D1-D5, further comprising injecting a an aqueous reagent into the reagent blister via an opening between the first and second sheets, sealing the fluid reagent in the reaction container by sealing the opening such that the reaction container is provided with the fluid reagent at the time of manufacture.

D7. The method of any of clauses D1-D6, wherein the aqueous reagent is configured for rehydrating the one or more dried reagents disposed in the reaction container in preparation for performing an assay using the reaction container.

D8. The method of any of clauses D1-D7, wherein the first sheet to the second sheet comprise a flexible polymeric material selected from the group consisting of polyester, polyethylene, polyethylene terephthalate (PET), polycarbonate, polypropylene (PP), polymethylmethacrylate, mixtures, combinations thereof.

D9. The method of any of clauses D1-D8, wherein the flexible polymeric material comprises a water vapor and/or oxygen barrier material.

D10. The method of any of clauses D1-D9, wherein the polymeric material comprising the water vapor and/or oxygen barrier material has a water vapor transmission rate (WVTR) in a range of about 0.01 $g/m^2/24$ hrs to about 3 $g/m^2/24$ hrs, preferably in a range of about 0.05 $g/m^2/24$ hrs to about 2 $g/m^2/24$ hrs, or more preferably no more than about 1 $g/m^2/24$ hrs, and an oxygen transmission rate in a range of about 0.01 $cc/m^2/24$ hrs to about 2 $cc/m^2/24$ hrs, preferably in a range of about 0.05 $cc/m^2/24$ hrs to about 2 $cc/m^2/24$ hrs, or more preferably no more than about 1 $cc/m^2/24$ hrs.

D11. The method of any of clauses D1-D10, wherein the liquid reagents dispensed onto the first or second sheet comprise an enzyme selected for use in a molecular biological or immunological assay (e.g., a reverse transcriptase, a DNA polymerase, and combinations thereof).

D12. The method of any of clauses D1-D11, wherein the enzyme regains its activity following the drying, laminating, and rehydration.

D13. The method of any of clauses D1-D12, wherein removing the reaction container from the forming die comprises separating the first forming plate and the second forming plate so the first and second sheets are no longer clamped in the forming die.

D14. The method of any of clauses D1-D13, wherein separating the first forming plate and the second forming plate comprises moving at least one of the first forming plate and the second forming plate.

D15. The method of any of clauses D1-D14, wherein separating the first forming plate and the second forming plate comprises moving only one of the first forming plate and the second forming plate.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the invention. The features and advantages may be realized and obtained by means of the instruments and combinations particularly pointed out in the appended claims. These and other features will become more fully apparent from the following description and appended claims, or may be learned by the practice of the invention as set forth hereinafter.

DETAILED DESCRIPTION

Figure 1:
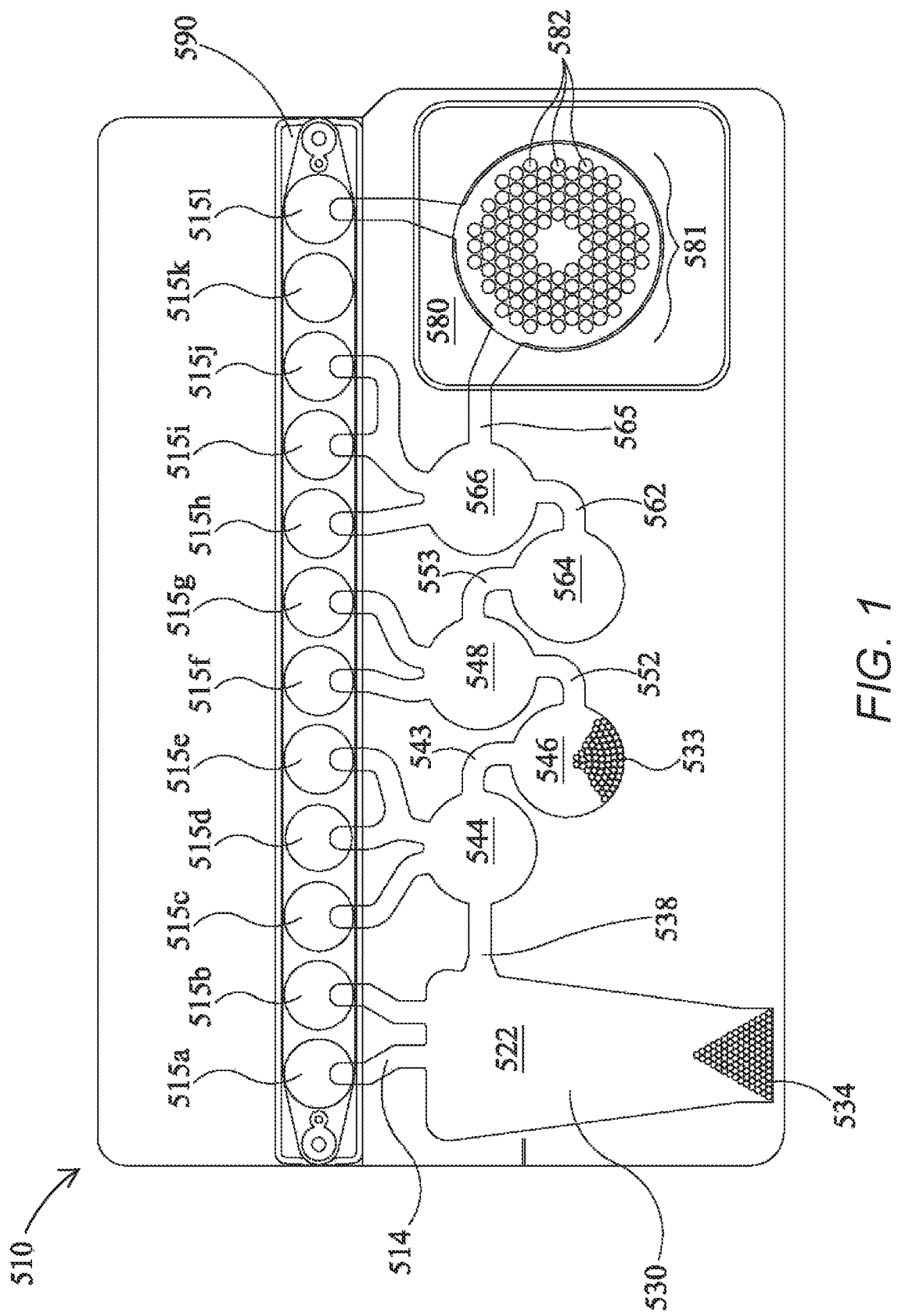
FIG. 1 shows a flexible pouch useful for self-contained PCR.

Example embodiments are described below with reference to the accompanying drawings. Many different forms and embodiments are possible without deviating from the spirit and teachings of this disclosure and so the disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of layers and regions may be exaggerated for clarity. Like reference numbers refer to like elements throughout the description.

Unless defined otherwise, all terms (including technical and scientific terms) used herein have the same meaning as commonly understood by one of ordinary skill in the art to which the present disclosure pertains. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. While a number of methods and materials similar or equivalent to those described herein can be used in the practice of the present disclosure, only certain exemplary materials and methods are described herein.

All publications, patent applications, patents or other references mentioned herein are incorporated by reference in their entirety. In case of a conflict in terminology, the present specification is controlling.

Various aspects of the present disclosure, including devices, systems, methods, etc., may be illustrated with reference to one or more exemplary implementations. As used herein, the terms "exemplary" and "illustrative" mean "serving as an example, instance, or illustration," and should not necessarily be construed as preferred or advantageous over other implementations disclosed herein. In addition, reference to an "implementation" or "embodiment" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an," and "the" include plural referents unless the content clearly dictates otherwise. Thus, for example, reference to "a tile" includes one, two, or more tiles. Similarly, reference to a plurality of referents should be interpreted as comprising a single referent and/or a plurality of referents unless the content and/or context clearly dictate otherwise. Thus, reference to "tiles" does not necessarily require a plurality of such tiles. Instead, it will be appreciated that independent of conjugation; one or more tiles are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

As used herein, directional and/or arbitrary terms, such as "top," "bottom," "left," "right," "up," "down," "upper," "lower," "inner," "outer," "internal," "external," "interior," "exterior," "proximal," "distal," "forward," "reverse," and the like can be used solely to indicate relative directions and/or orientations and may not be otherwise intended to limit the scope of the disclosure, including the specification, invention, and/or claims.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present.

Example embodiments of the present inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the present inventive concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

It is also understood that various implementations described herein can be utilized in combination with any other implementation described or disclosed, without departing from the scope of the present disclosure. Therefore, products, members, elements, devices, apparatuses, systems, methods, processes, compositions, and/or kits according to certain implementations of the present disclosure can include, incorporate, or otherwise comprise properties, features, components, members, elements, steps, and/or the like described in other implementations (including systems, methods, apparatus, and/or the like) disclosed herein without departing from the scope of the present disclosure. Thus, reference to a specific feature in relation to one implementation should not be construed as being limited to applications only within that implementation.

The headings used herein are for organizational purposes only and are not meant to be used to limit the scope of the description or the claims. To facilitate understanding, like reference numerals have been used, where possible, to designate like elements common to the figures. Furthermore, where possible, like numbering of elements have been used in various figures. Furthermore, alternative configurations of a particular element may each include separate letters appended to the element number.

The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 5%. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The word "or" as used herein means any one member of a particular list and also includes any combination of members of that list.

By "sample" is meant an animal; a tissue or organ from an animal, including, but not limited to, a human animal; a cell (either within a subject (e.g., a human or non-human animal), taken directly from a subject, or a cell maintained in culture or from a cultured cell line); a cell lysate (or lysate fraction) or cell extract; a solution containing one or more molecules derived from a cell, cellular material, or viral material (e.g. a polypeptide or nucleic acid); or a solution containing a non-naturally occurring nucleic acid, which is assayed as described herein. A sample may also be any body fluid or excretion (for example, but not limited to, blood, urine, stool, saliva, tears, bile, or cerebrospinal fluid) that may or may not contain host or pathogen cells, cell components, or nucleic acids. Samples may also include environmental samples such as, but not limited to, soil, water (fresh water, waste water, etc.), air monitoring system samples (e.g., material captured in an air filter medium), surface swabs, and vectors (e.g., mosquitos, ticks, fleas, etc.).

The phrase "nucleic acid" as used herein refers to a naturally occurring or synthetic oligonucleotide or polynucleotide, whether DNA or RNA or DNA-RNA hybrid, single-stranded or double-stranded, sense or antisense, which is capable of hybridization to a complementary nucleic acid by Watson-Crick base-pairing. Nucleic acids of the invention can also include nucleotide analogs (e.g., BrdU), and non-phosphodiester internucleoside linkages (e.g., peptide nucleic acid (PNA) or thiodiester linkages). In particular, nucleic acids can include, without limitation, DNA, RNA, mRNA, rRNA, cDNA, gDNA, ssDNA, dsDNA, or any combination thereof.

By "probe," "primer," or "oligonucleotide" is meant a single-stranded nucleic acid molecule of defined sequence that can base-pair to a second nucleic acid molecule that contains a complementary sequence (the "target"). The stability of the resulting hybrid depends upon the length, GC content, and the extent of the base-pairing that occurs. The extent of base-pairing is affected by parameters such as the degree of complementarity between the probe and target molecules and the degree of stringency of the hybridization conditions. The degree of hybridization stringency is affected by parameters such as temperature, salt concentration, and the concentration of organic molecules such as formamide, and is determined by methods known to one skilled in the art. Probes, primers, and oligonucleotides may be detectably-labeled, either radioactively, fluorescently, or non-radioactively, by methods well-known to those skilled in the art. dsDNA binding dyes may be used to detect dsDNA. It is understood that a "primer" is specifically configured to be extended by a polymerase, whereas a "probe" or "oligonucleotide" may or may not be so configured.

By "dsDNA binding dyes" is meant dyes that fluoresce differentially when bound to double-stranded DNA than when bound to single-stranded DNA or free in solution, usually by fluorescing more strongly. While reference is made to dsDNA binding dyes, it is understood that any suitable dye may be used herein, with some non-limiting illustrative dyes described in U.S. Pat. No. 7,387,887, herein incorporated by reference. Other signal producing substances may be used for detecting nucleic acid amplification and melting, illustratively enzymes, antibodies, etc., as are known in the art.

By "specifically hybridizes" is meant that a probe, primer, or oligonucleotide recognizes and physically interacts (that is, base-pairs) with a substantially complementary nucleic acid (for example, a sample nucleic acid) under high stringency conditions, and does not substantially base pair with other nucleic acids.

By "high stringency conditions" is meant typically to occur at about a melting temperature (Tm) minus 5° C. (i.e. 5° below the Tm of the probe). Functionally, high stringency conditions are used to identify nucleic acid sequences having at least 80% sequence identity.

By "lysis particles" is meant various particles or beads for the lysis of cells, viruses, spores, and other material that may be present in a sample. Various examples use Zirconium ("Zr") silicate or ceramic beads, but other lysis particles are known and are within the scope of this term, including glass and sand lysis particles. The term "cell lysis component" may include lysis particles, but may also include other components, such as components for chemical lysis, as are known in the art.

While PCR is the amplification method used in the examples herein, it is understood that any amplification method that uses a primer may be suitable. Such suitable procedures include polymerase chain reaction (PCR); strand displacement amplification (SDA); nucleic acid sequence-based amplification (NASBA); cascade rolling circle amplification (CRCA), loop-mediated isothermal amplification of DNA (LAMP); isothermal and chimeric primer-initiated amplification of nucleic acids (ICAN); target based-helicase dependent amplification (HDA); transcription-mediated amplification (TMA), and the like. Therefore, when the term PCR is used, it should be understood to include other alternative amplification methods. For amplification methods without discrete cycles, reaction time may be used where measurements are made in cycles, doubling time, or crossing point (Cp), and additional reaction time may be added where additional PCR cycles are added in the embodiments described herein. It is understood that protocols may need to be adjusted accordingly.

While various examples herein reference human targets and human pathogens, these examples are illustrative only. Methods, kits, and devices described herein may be used to detect and sequence a wide variety of nucleic acid sequences from a wide variety of samples, including, human, veterinary, industrial, and environmental.

Various embodiments disclosed herein use a self-contained nucleic acid analysis pouch to assay a sample for the presence of various biological substances, illustratively antigens and nucleic acid sequences, illustratively in a single closed system. Such systems, including pouches and instruments for use with the pouches, are disclosed in more detail in U.S. Pat. Nos. 8,394,608, 8,895,295, 10,464,060, herein incorporated by reference in their entireties. However, it is understood that such pouches are illustrative only, and the nucleic acid preparation and amplification reactions discussed herein may be performed in any of a variety of open or closed system sample vessels as are known in the art, including 96-well plates, plates of other configurations, arrays, carousels, and the like, using a variety of nucleic acid purification and amplification systems, as are known in the art. While the terms "sample well", "amplification well", "amplification container", or the like are used herein, these terms are meant to encompass wells, tubes, and various other reaction containers, as are used in these amplification systems. In one embodiment, the pouch is used to assay for multiple pathogens. The pouch may include one or more blisters used as sample wells, illustratively in a closed system. Illustratively, various steps may be performed in the optionally disposable pouch, including nucleic acid preparation, primary large volume multiplex PCR, dilution of primary amplification product, and secondary PCR, culminating with optional real-time detection or post-amplification analysis such as melting-curve analysis. Further, it is understood that while the various steps may be performed in pouches of the present invention, one or more of the steps may be omitted for certain uses, and the pouch configuration may be altered accordingly. While many embodiments herein use a multiplex reaction for the first-stage amplification, it is understood that this is illustrative only, and that in some embodiments the first-stage amplification may be singleplex. In one illustrative example, the first-stage singleplex amplification targets housekeeping genes, and the second-stage amplification uses differences in housekeeping genes for identification. Thus, while various embodiments discuss first-stage multiplex amplification, it is understood that this is illustrative only.

FIG. 1 shows an illustrative pouch 510 that may be used in various embodiments, or may be reconfigured for various embodiments. Pouch 510 is similar to FIG. 15 of U.S. Pat. No. 8,895,295, with like items numbered the same. Fitment 590 is provided with entry channels 515a through 515l, which also serve as reagent reservoirs or waste reservoirs. Illustratively, reagents may be freeze dried in fitment 590 and rehydrated prior to use. Blisters 522, 544, 546, 548, 564, and 566, with their respective channels 514, 538, 543, 552, 553, 562, and 565 are similar to blisters of the same number of FIG. 15 of U.S. Pat. No. 8,895,295.

Second-stage reaction zone 580 of FIG. 1 is similar to that of U.S. Pat. No. 8,895,295, but the second-stage wells 582 of high density array 581 are arranged in a somewhat different pattern. The more circular nature of high density array 581 of FIG. 1 eliminates wells in corners and may result in more uniform filling of second-stage wells 582. As shown, the high density array 581 is provided with 102 second-stage wells 582. Pouch 510 is suitable for use in the FilmArray® instrument (BioFire Diagnostics, LLC, Salt Lake City, Utah). However, it is understood that the pouch embodiment is illustrative only.

While other containers may be used, illustratively, pouch 510 may be formed of two layers of a flexible plastic film or other flexible material such as polyester, polyethylene terephthalate (PET), polycarbonate, polypropylene, polymethylmethacrylate, mixtures, combinations, and layers thereof that can be made by any process known in the art, including extrusion, plasma deposition, and lamination. For instance, each layer can be composed of one or more layers of material of a single type or more than one type that are laminated together. Metal foils or plastics with aluminum lamination also may be used. Other barrier materials are known in the art that can be sealed together to form the blisters and channels. If plastic film is used, the layers may be bonded together, illustratively by heat sealing. Illustratively, the material has low nucleic acid binding and low protein binding capacity.

For embodiments employing fluorescent monitoring, plastic films that are adequately low in absorbance and auto-fluorescence at the operative wavelengths are preferred. Such material could be identified by testing different plastics, different plasticizers, and composite ratios, as well as different thicknesses of the film. For plastics with aluminum or other foil lamination, the portion of the pouch that is to be read by a fluorescence detection device can be left without the foil. For example, if fluorescence is monitored in second-stage wells 582 of the second-stage reaction zone 580 of pouch 510, then one or both layers at wells 582 would be left without the foil (e.g., made from optically transparent material). In the example of PCR, film laminates composed of polyester (Mylar, DuPont, Wilmington Del.) of about 0.0048 inch (0.1219 mm) thick and polypropylene films of 0.001-0.003 inch (0.025-0.076 mm) thick perform well. Illustratively, pouch 510 may be made of a clear material capable of transmitting approximately 80%-90% of incident light.

In the illustrative embodiment, materials are moved between blisters by the application of pressure, illustratively pneumatic pressure, upon the blisters and channels. Accordingly, in embodiments employing pressure, the pouch material illustratively is flexible enough to allow the pressure to have the desired effect. The term "flexible" is herein used to describe a physical characteristic of the material of the pouch. The term "flexible" is herein defined as readily deformable by the levels of pressure used herein without cracking, breaking, crazing, or the like. For example, thin plastic sheets, such as Saran™ wrap and Ziploc® bags, as well as thin metal foil, such as aluminum foil, are flexible. However, only certain regions of the blisters and channels need be flexible, even in embodiments employing pneumatic pressure. Further, only one side of the blisters and channels need to be flexible, as long as the blisters and channels are readily deformable. Other regions of the pouch 510 may be made of a rigid material or may be reinforced with a rigid material. Thus, it is understood that when the terms "flexible pouch" or "flexible sample container" or the like are used, only portions of the pouch or sample container need be flexible.

Illustratively, a plastic film may be used for pouch 510. A sheet of metal, illustratively aluminum, or other suitable material, may be milled or otherwise cut, to create a die having a pattern of raised surfaces. When fitted into a pneumatic press (illustratively A-5302-PDS, Janesville Tool Inc., Milton Wis.), illustratively regulated at an operating temperature of 195° C., the pneumatic press works like a printing press, melting the sealing surfaces of plastic film only where the die contacts the film. Likewise, the plastic film(s) used for pouch 510 may be cut and welded together using a laser cutting and welding device. Various components, such as PCR primers (illustratively spotted onto the film and dried), antigen binding substrates, magnetic beads, and zirconium silicate beads may be sealed inside various blisters as the pouch 510 is formed. Reagents for sample processing can be spotted onto the film prior to sealing, either collectively or separately. In one embodiment, nucleotide tri-phosphates (NTPs) are spotted onto the film separately from polymerase and primers, essentially eliminating activity of the polymerase until the reaction may be hydrated by an aqueous sample. If the aqueous sample has been heated prior to hydration, this creates the conditions for a true hot-start PCR and reduces or eliminates the need for expensive chemical hot-start components. In another embodiment, components may be provided in powder or pill form and are placed into blisters prior to final sealing.

Pouch 510 may be used in a manner similar to that described in U.S. Pat. No. 8,895,295. In one illustrative embodiment, a 300 μl mixture comprising the sample to be tested (100 μl) and lysis buffer (200 μl) may be injected into an injection port (not shown) in fitment 590 near entry channel 515*a*, and the sample mixture may be drawn into entry channel 515*a*. Water may also be injected into a second injection port (not shown) of the fitment 590 adjacent entry channel 515*l*, and is distributed via a channel (not shown) provided in fitment 590, thereby hydrating up to eleven different reagents, each of which were previously provided in dry form at entry channels 515*b* through 515*l*. Illustrative methods and devices for injecting sample and hydration fluid (e.g. water or buffer) are disclosed in U.S. Pat. No. 10,464,060, herein incorporated by reference in its entirety, although it is understood that these methods and devices are illustrative only and other ways of introducing sample and hydration fluid into pouch 510 are within the scope of this disclosure. These reagents illustratively may include freeze-dried PCR reagents, DNA extraction reagents, wash solutions, immunoassay reagents, or other chemical entities. Illustratively, the reagents are for nucleic acid extraction, first-stage multiplex PCR, dilution of the multiplex reaction, and preparation of second-stage PCR reagents, as well as control reactions. In the embodiment shown in FIG. 1, all that need be injected is the sample solution in one injection port and water in the other injection port. After injection, the two injection ports may be sealed. For more information on various configurations of pouch 510 and fitment 590, see U.S. Pat. No. 8,895,295, already incorporated by reference.

After injection, the sample may be moved from injection channel 515*a* to lysis blister 522 via channel 514. Lysis blister 522 is provided with beads or particles 534, such as ceramic beads or other abrasive elements, and is configured for vortexing via impaction using rotating blades or paddles provided within the FilmArray® instrument. Bead-milling, by shaking, vortexing, sonicating, and similar treatment of the sample in the presence of lysis particles such as zirconium silicate (ZS) beads 534, is an effective method to form a lysate. It is understood that, as used herein, terms such as "lyse," "lysing," and "lysate" are not limited to rupturing cells, but that such terms include disruption of non-cellular particles, such as viruses. In another embodiment, a paddle beater using reciprocating or alternating paddles, such as those described in U.S. Pat. Pub. No. 2019/0344269, herein incorporated by reference in its entirety, may be used for lysis in this embodiment, as well as in the other embodiments described herein.

Figure 2:
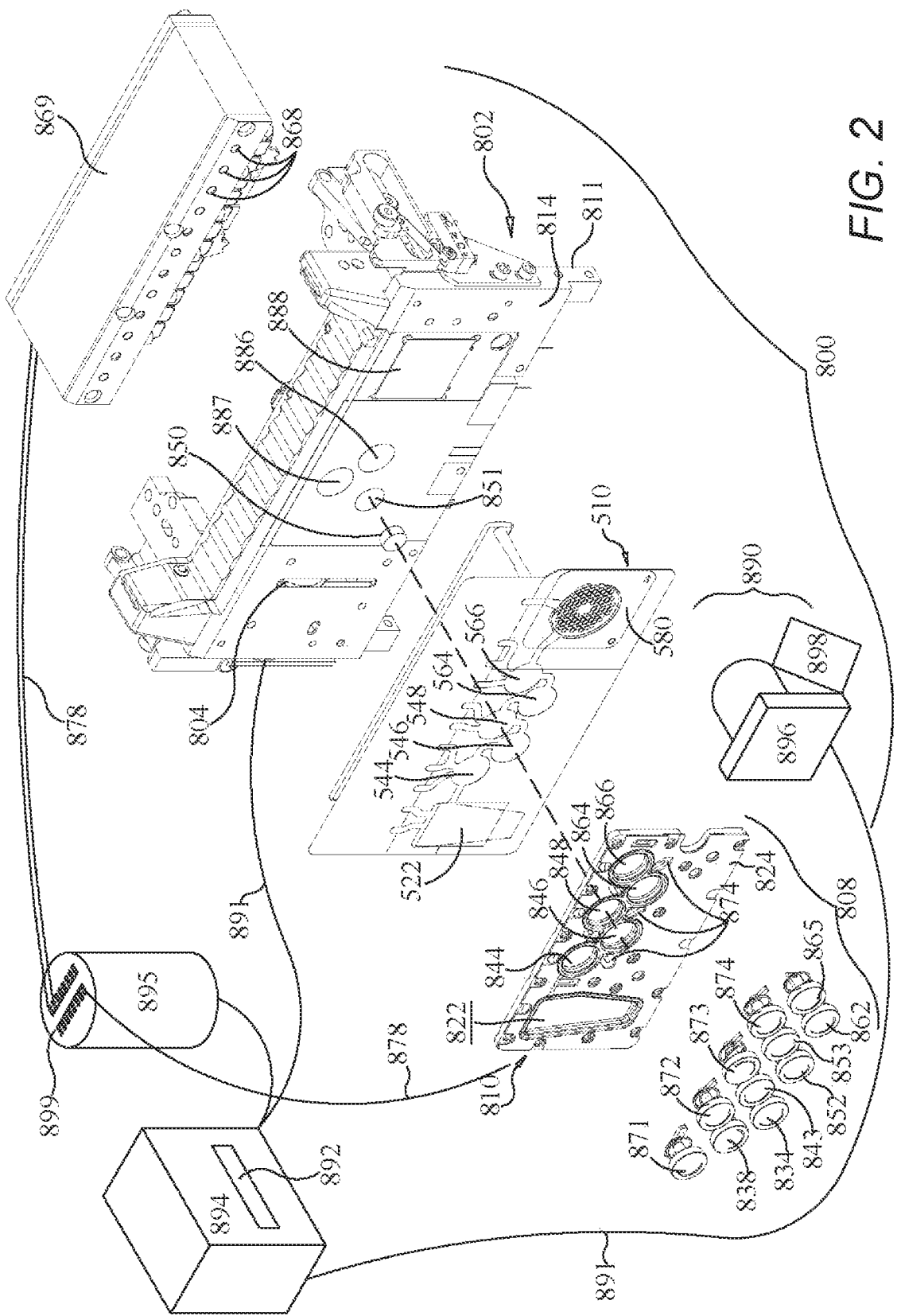
FIG. 2 is an exploded perspective view of an instrument for use with the pouch of FIG. 1, including the pouch of FIG. 1.
Figure 4:
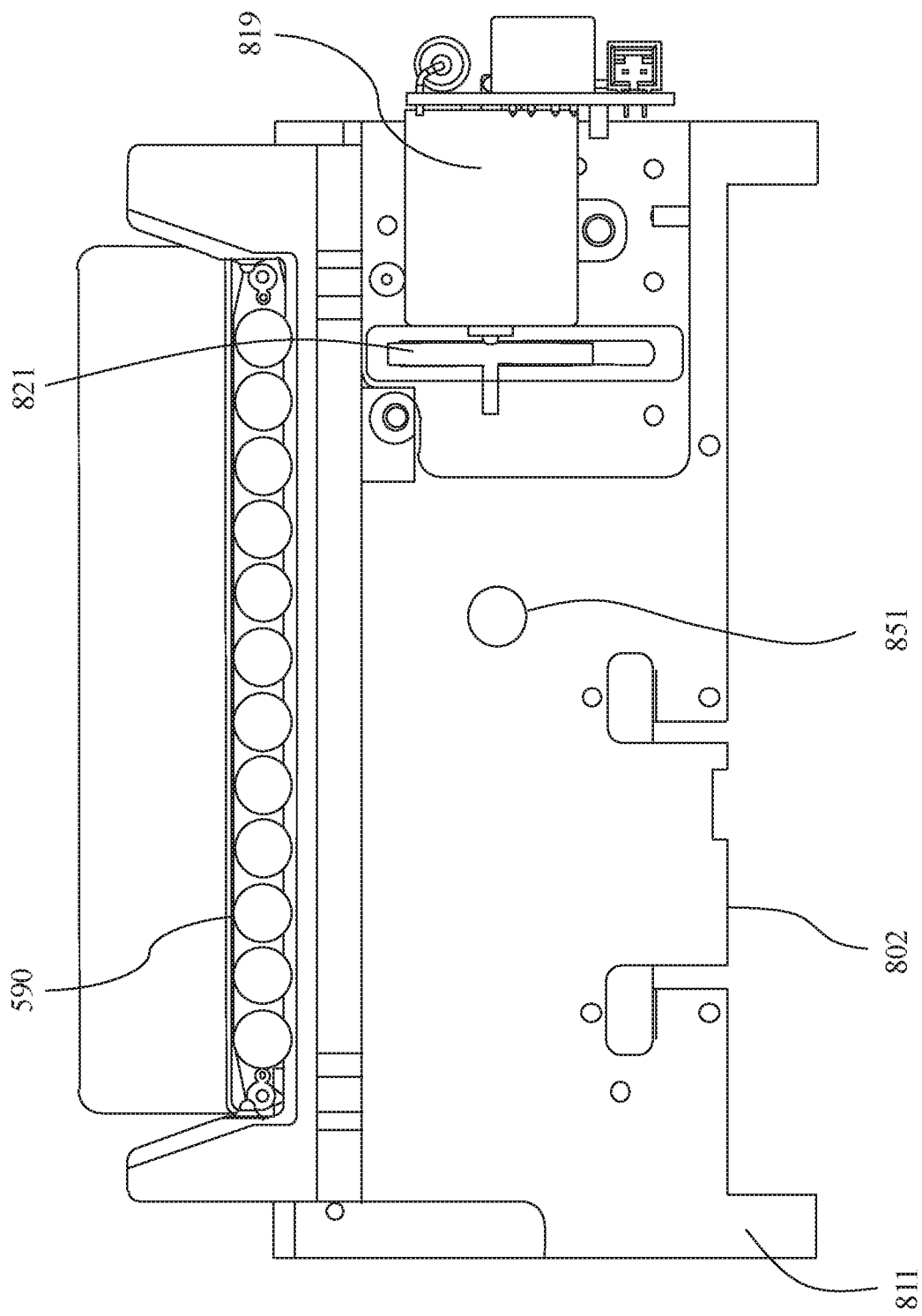
FIG. 4 shows a motor used in one illustrative embodiment of the instrument of FIG. 2.

FIG. 4 shows a bead beating motor 819 of instrument 800 of FIG. 2. The bead beating motor 819 comprises blades 821 that may be mounted on a first side 811 of support member 802 of the instrument 800. Blades may extend through slot 804 to contact pouch 510. It is understood, however, that motor 819 may be mounted on other structures of instrument 800. In one illustrative embodiment, motor 819 is a Mabuchi RC-280SA-2865 DC Motor (Chiba, Japan), mounted on support member 802. In one illustrative embodiment, the motor is turned at 5,000 to 25,000 rpm, more illustratively 10,000 to 20,000 rpm, and still more illustratively approximately 15,000 to 18,000 rpm. For the Mabuchi motor, it has been found that 7.2V provides sufficient rpm for lysis. It is understood, however, that the actual speed may be somewhat slower when the blades 821 are impacting pouch 510. Other voltages and speeds may be used for lysis depending on the motor and paddles used. Optionally, controlled small volumes of air may be provided into the bladder 822 adjacent lysis blister 522. It has been found that in some embodiments, partially filling the adjacent bladder with one or more small volumes of air aids in positioning and supporting lysis blister during the lysis process. Alternatively, another structure, illustratively a rigid or compliant gasket or other retaining structure around lysis blister 522, can be used to restrain pouch 510 during lysis. It is also understood that motor 819 is illustrative only, and other devices may be used for milling, shaking, or vortexing the sample. In some embodiments, chemicals or heat may be used in addition to or instead of mechanical lysis.

Once the sample material has been adequately lysed, the sample is moved to a nucleic acid extraction zone, illustratively through channel 538, blister 544, and channel 543, to blister 546, where the sample is mixed with a nucleic acid-binding substance, such as silica-coated magnetic beads 533. Alternatively, magnetic beads 533 may be rehydrated, illustratively using fluid provided from one of the entry channel 515*c*-515*e*, and then moved through channel 543 to blister 544, and then through channel 538 to blister 522. The mixture is allowed to incubate for an appropriate length of time, illustratively approximately 10 seconds to 10 minutes. A retractable magnet located within the instrument adjacent blister 546 (see, e.g., magnet 850, FIG. 2) captures the magnetic beads 533 from the solution, forming a pellet against the interior surface of blister 546. If incubation takes place in blister 522, multiple portions of the solution may need to be moved to blister 546 for capture. The liquid is then moved out of blister 546 and back through blister 544 and into blister 522, which is now used as a waste receptacle. One or more wash buffers from one or more of injection channels 515*c* to 515*e* are provided via blister 544 and channel 543 to blister 546. Optionally, the magnet is retracted and the magnetic beads 533 are washed by moving the beads back and forth from blisters 544 and 546 via channel 543. Once the magnetic beads 533 are washed, the magnetic beads 533 are recaptured in blister 546 by activation of the magnet, and the wash solution is then moved to blister 522. This process may be repeated as necessary to wash the lysis buffer and sample debris from the nucleic acid-binding magnetic beads 533.

After washing, elution buffer stored at injection channel 515*f* is moved to blister 548, and the magnet is retracted. The solution is cycled between blisters 546 and 548 via channel 552, breaking up the pellet of magnetic beads 533 in blister 546 and allowing the captured nucleic acids to dissociate from the beads and come into solution. The magnet is once again activated, capturing the magnetic beads 533 in blister 546, and the eluted nucleic acid solution is moved into blister 548.

First-stage PCR master mix from injection channel 515*g* is mixed with the nucleic acid sample in blister 548. Optionally, the mixture is mixed by forcing the mixture between blisters 548 and 564 via channel 553. After several cycles of mixing, the solution is contained in blister 564, where a pellet of first-stage PCR primers is provided, at least one set of primers for each target, and first-stage multiplex PCR is performed. If RNA targets are present, a reverse transcription (RT) step may be performed prior to or simultaneously with the first-stage multiplex PCR. First-stage multiplex PCR temperature cycling in the FilmArray® instrument is illustratively performed for 15-20 cycles, although other levels of amplification may be desirable, depending on the requirements of the specific application. The first-stage PCR master mix may be any of various master mixes, as are known in the art. In one illustrative example, the first-stage PCR master mix may be any of the chemistries disclosed in U.S. Pat. No. 9,932,634, herein incorporated by reference, for use with PCR protocols taking 20 seconds or less per cycle.

After first-stage PCR has proceeded for the desired number of cycles, the sample may be diluted, illustratively by forcing most of the sample back into blister 548, leaving only a small amount in blister 564, and adding second-stage PCR master mix from injection channel 515*i*. Alternatively, a dilution buffer from 515*i* may be moved to blister 566 then mixed with the amplified sample in blister 564 by moving the fluids back and forth between blisters 564 and 566 via channel 562. If desired, dilution may be repeated several times, using dilution buffer from injection channels 515*j* and 515*k*, or injection channel 515*k* may be reserved, illustratively, for sequencing or for other post-PCR analysis, and then adding second-stage PCR master mix from injection channel 515*h* to some or all of the diluted amplified sample. It is understood that the level of dilution may be adjusted by altering the number of dilution steps or by altering the percentage of the sample discarded prior to mixing with the dilution buffer or second-stage PCR master mix comprising components for amplification, illustratively a polymerase, dNTPs, and a suitable buffer, although other components may be suitable, particularly for non-PCR amplification methods. If desired, this mixture of the sample and second-stage PCR master mix may be pre-heated in blister 564 prior to movement to second-stage wells 582 for second-stage amplification. Such preheating may obviate the need for a hot-start component (antibody, chemical, or otherwise) in the second-stage PCR mixture.

In one embodiment, the illustrative second-stage PCR master mix is incomplete, lacking primer pairs, and each of the 102 second-stage wells 582 is pre-loaded with a specific PCR primer pair. In other embodiments, the master mix may lack other components (e.g., polymerase, $Mg^{2+}$, etc.) and the lacking components may be pre-loaded in the array. If desired, second-stage PCR master mix may lack other reaction components, and these components may be pre-loaded in the second-stage wells 582 as well. Each primer pair may be similar to or identical to a first-stage PCR primer pair or may be nested within the first-stage primer pair. Movement of the sample from blister 564 to the second-stage wells 582 completes the PCR reaction mixture. Once high density array 581 is filled, the individual second-stage reactions are sealed in their respective second-stage blisters by any number of means, as is known in the art. Illustrative ways of filling and sealing the high density array 581 without cross-contamination are discussed in U.S. Pat. No. 8,895,295, already incorporated by reference. Illustratively, the various reactions in wells 582 of high density array 581 are simultaneously or individually thermal cycled, illustratively with one or more Peltier devices, although other means for thermal cycling are known in the art.

In certain embodiments, second-stage PCR master mix contains the dsDNA binding dye LCGreen® Plus (BioFire Diagnostics, LLC) to generate a signal indicative of amplification. However, it is understood that this dye is illustrative only, and that other signals may be used, including other dsDNA binding dyes and probes that are labeled fluorescently, radioactively, chemiluminescently, enzymatically, or the like, as are known in the art. Alternatively, wells 582 of array 581 may be provided without a signal, with results reported through subsequent processing.

Figure 3:
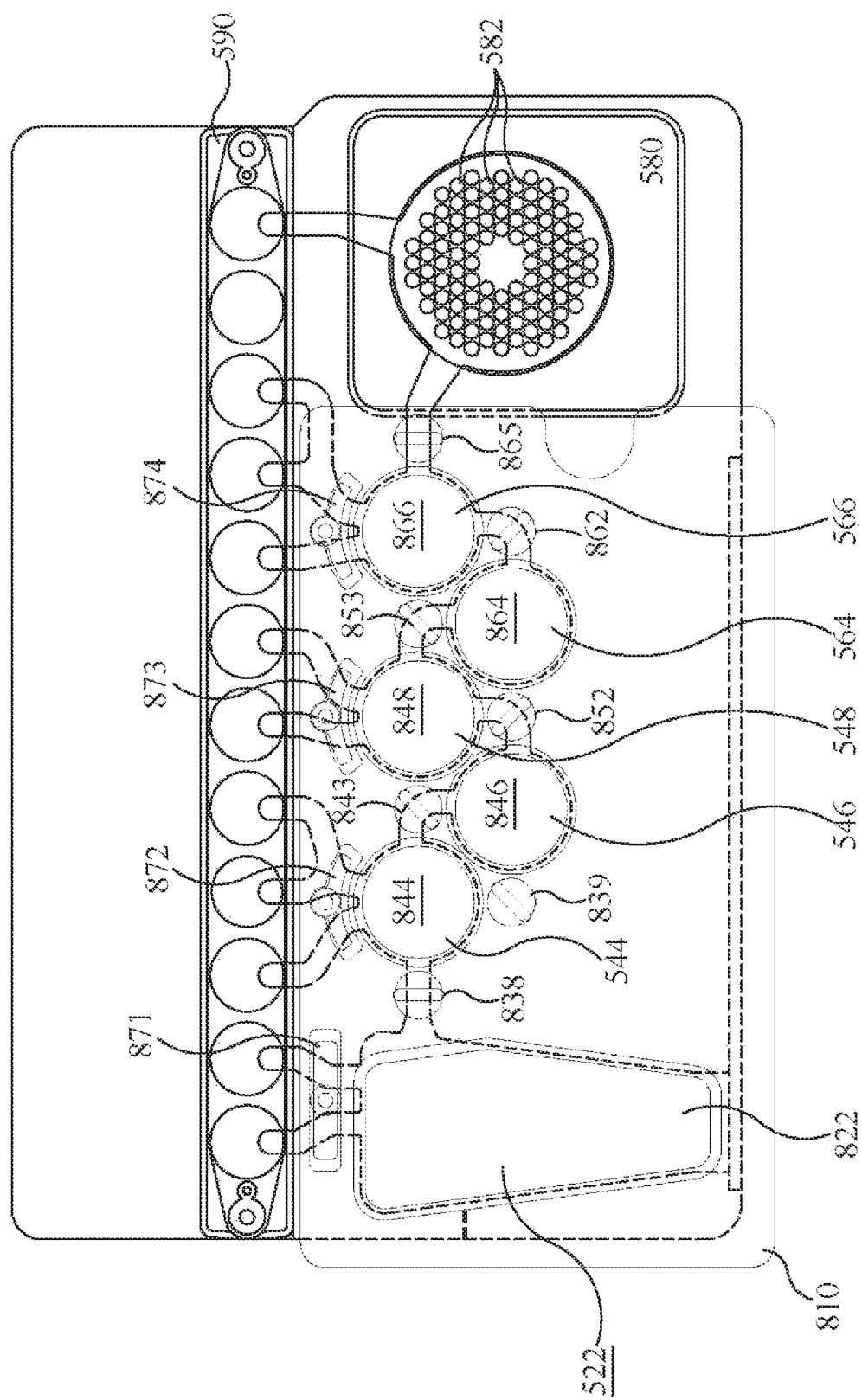
FIG. 3 shows the pouch of FIG. 1 along with bladder components of the instrument of FIG. 2.

When pneumatic pressure is used to move materials within pouch 510, in one embodiment, a "bladder" may be employed. The bladder assembly 810, a portion of which is shown in FIGS. 2-3, includes a bladder plate 824 housing a plurality of inflatable bladders 822, 844, 846, 848, 864, and 866, each of which may be individually inflatable, illustratively by a compressed gas source. Because the bladder assembly 810 may be subjected to compressed gas and used multiple times, the bladder assembly 810 may be made from tougher or thicker material than the pouch. Alternatively, bladders 822, 844, 846, 848, 864, and 866 may be formed from a series of plates fastened together with gaskets, seals, valves, and pistons. Other arrangements are within the scope of this invention. Alternatively, an array of mechanical actuators and seals may be used to seal channels and direct movement of fluids between blisters. A system of mechanical seals and actuators that may be adapted for the instruments described herein is described in detail in U.S. Pat. Pub. No. 2019/0344269, the entirety of which is already incorporated by reference.

Success of the secondary PCR reactions is dependent upon template generated by the multiplex first-stage reaction. Typically, PCR is performed using DNA of high purity. Methods such as phenol extraction or commercial DNA extraction kits provide DNA of high purity. Samples processed through the pouch 510 may require accommodations be made to compensate for a less pure preparation. PCR may be inhibited by components of biological samples, which is a potential obstacle. Illustratively, hot-start PCR, higher concentration of Taq polymerase enzyme, adjustments in $MgCl_2$ concentration, adjustments in primer concentration, addition of engineered enzymes that are resistant to inhibitors, and addition of adjuvants (such as DMSO, TMSO, or glycerol) optionally may be used to compensate for lower nucleic acid purity. While purity issues are likely to be more of a concern with first-stage amplification, it is understood that similar adjustments may be provided in the second-stage amplification as well.

When pouch 510 is placed within the instrument 800, the bladder assembly 810 is pressed against one face of the pouch 510, so that if a particular bladder is inflated, the pressure will force the liquid out of the corresponding blister in the pouch 510. In addition to bladders corresponding to many of the blisters of pouch 510, the bladder assembly 810 may have additional pneumatic actuators, such as bladders or pneumatically-driven pistons, corresponding to various channels of pouch 510. FIGS. 2-3 show an illustrative plurality of pistons or hard seals 838, 843, 852, 853, and 865 that correspond to channels 538, 543, 553, and 565 of pouch 510, as well as seals 871, 872, 873, 874 that minimize backflow into fitment 590. When activated, hard seals 838, 843, 852, 853, and 865 form pinch valves to pinch off and close the corresponding channels. To confine liquid within a particular blister of pouch 510, the hard seals are activated over the channels leading to and from the blister, such that the actuators function as pinch valves to pinch the channels shut. Illustratively, to mix two volumes of liquid in different blisters, the pinch valve actuator sealing the connecting channel is activated, and the pneumatic bladders over the blisters are alternately pressurized, forcing the liquid back and forth through the channel connecting the blisters to mix the liquid therein. The pinch valve actuators may be of various shapes and sizes and may be configured to pinch off more than one channel at a time. While pneumatic actuators are discussed herein, it is understood that other ways of providing pressure to the pouch are contemplated, including various electromechanical actuators such as linear stepper motors, motor-driven cams, rigid paddles driven by pneumatic, hydraulic or electromagnetic forces, rollers, rocker-arms, and in some cases, cocked springs. In addition, there are a variety of methods of reversibly or irreversibly closing channels in addition to applying pressure normal to the axis of the channel. These include kinking the bag across the channel, heat-sealing, rolling an actuator, and a variety of physical valves sealed into the channel such as butterfly valves and ball valves. Additionally, small Peltier devices or other temperature regulators may be placed adjacent the channels and set at a temperature sufficient to freeze the fluid, effectively forming a seal. Also, while the design of FIG. 1 is adapted for an automated instrument featuring actuator elements positioned over each of the blisters and channels, it is also contemplated that the actuators could remain stationary, and the pouch 510 could be transitioned such that a small number of actuators could be used for several of the processing stations including sample disruption, nucleic-acid capture, first and second-stage PCR, and processing stations for other applications of the pouch 510 such as immuno-assay and immuno-PCR. Rollers acting on channels and blisters could prove particularly useful in a configuration in which the pouch 510 is translated between stations. Thus, while pneumatic actuators are used in the presently disclosed embodiments, when the term "pneumatic actuator" is used herein, it is understood that other actuators and other ways of providing pressure may be used, depending on the configuration of the pouch and the instrument.

Turning back to FIG. 2, each pneumatic actuator is connected to compressed air source 895 via valves 899. While only several hoses 878 are shown in FIG. 2, it is understood that each pneumatic fitting is connected via a hose 878 to the compressed gas source 895. Compressed gas source 895 may be a compressor, or, alternatively, compressed gas source 895 may be a compressed gas cylinder, such as a carbon dioxide cylinder. Compressed gas cylinders are particularly useful if portability is desired. Other sources of compressed gas are within the scope of this invention. Similar pneumatic control may be provided, for example, for control of fluid movement in the pouches described herein, or other actuators, servos, or the like may be provided.

Several other components of instrument 810 are also connected to compressed gas source 895. A magnet 850, which is mounted on a second side 814 of support member 802, is illustratively deployed and retracted using gas from compressed gas source 895 via hose 878, although other methods of moving magnet 850 are known in the art. Magnet 850 sits in recess 851 in support member 802. It is understood that recess 851 can be a passageway through support member 802, so that magnet 850 can contact blister 546 of pouch 510.

However, depending on the material of support member 802, it is understood that recess 851 need not extend all the way through support member 802, as long as when magnet 850 is deployed, magnet 850 is close enough to provide a sufficient magnetic field at blister 546, and when magnet 850 is fully retracted, magnet 850 does not significantly affect any magnetic beads 533 present in blister 546. While reference is made to retracting magnet 850, it is understood that an electromagnet may be used and the electromagnet may be activated and inactivated by controlling flow of electricity through the electromagnet. Thus, while this specification discusses withdrawing or retracting the magnet, it is understood that these terms are broad enough to incorporate other ways of withdrawing the magnetic field. It is understood that the pneumatic connections may be pneumatic hoses or pneumatic air manifolds, thus reducing the number of hoses or valves required. It is understood that similar magnets and methods for activating the magnets may be used in other embodiments.

The various pneumatic pistons 868 of pneumatic piston array 869 are also connected to compressed gas source 895 via hoses 878. While only two hoses 878 are shown connecting pneumatic pistons 868 to compressed gas source 895, it is understood that each of the pneumatic pistons 868 are connected to compressed gas source 895. Twelve pneumatic pistons 868 are shown, although other configurations are within the scope of the present invention.

A pair of temperature control elements are mounted on a second side 814 of support 802. As used herein, the term "temperature control element" refers to a device that adds heat to or removes heat from a sample. Illustrative examples of a temperature control element include, but are not limited to, heaters, coolers, Peltier devices, resistive heaters, induction heaters, electromagnetic heaters, thin film heaters, printed element heaters, positive temperature coefficient heaters, and combinations thereof. A temperature control element may include multiple heaters, coolers, Peltiers, etc. In one aspect, a given temperature control element may include more than one type of heater or cooler. For instance, an illustrative example of a temperature control element may include a Peltier device with a separate resistive heater applied to the top and/or the bottom face of the Peltier. While the term "heater" is used throughout the specification, it is understood that other temperature control elements may be used to adjust the temperature of the sample.

As discussed above, first-stage heater 886 may be positioned to heat and cool the contents of blister 564 for first-stage PCR. As seen in FIG. 2, second-stage heater 888 may be positioned to heat and cool the contents of second-stage blisters 582 of array 581 of pouch 510, for second-stage PCR. It is understood, however, that these heaters could also be used for other heating purposes, and that other heaters may be included, as appropriate for the particular application.

As discussed above, while Peltier devices, which thermocycle between two or more temperatures, are effective for PCR, it may be desirable in some embodiments to maintain heaters at a constant temperature. Illustratively, this can be used to reduce run time, by eliminating time needed to transition the heater temperature beyond the time needed to transition the sample temperature. Also, such an arrangement can improve the electrical efficiency of the system as it is only necessary to thermally cycle the smaller sample and sample vessel, not the much larger (more thermal mass) Peltier devices. For instance, an instrument may include multiple heaters (i.e., two or more) at temperatures set for, for example, annealing, extension, denaturation that are positioned relative to the pouch to accomplish thermal cycling. Two heaters may be sufficient for many applications. In various embodiments, the heaters can be moved, the pouch can be moved, or fluids can be moved relative to the heaters to accomplish thermal cycling. Illustratively, the heaters may be arranged linearly, in a circular arrangement, or the like. Types of suitable heaters have been discussed above, with reference to first-stage PCR.

When fluorescent detection is desired, an optical array 890 may be provided. As shown in FIG. 2, optical array 890 includes a light source 898, illustratively a filtered LED light source, filtered white light, or laser illumination, and a camera 896. Camera 896 illustratively has a plurality of photodetectors each corresponding to a second-stage well 582 in pouch 510. Alternatively, camera 896 may take images that contain all of the second-stage wells 582, and the image may be divided into separate fields corresponding to each of the second-stage wells 582. Depending on the configuration, optical array 890 may be stationary, or optical array 890 may be placed on movers attached to one or more motors and moved to obtain signals from each individual second-stage well 582. It is understood that other arrangements are possible. Some embodiments for second-stage heaters provide the heaters on the opposite side of pouch 510 from that shown in FIG. 2. Such orientation is illustrative only and may be determined by spatial constraints within the instrument. Provided that second-stage reaction zone 580 is provided in an optically transparent material, photodetectors and heaters may be on either side of array 581.

As shown, a computer 894 controls valves 899 of compressed air source 895, and thus controls all of the pneumatics of instrument 800. In addition, many of the pneumatic systems in the instrument may be replaced with mechanical actuators, pressure applying means, and the like in other embodiments. Computer 894 also controls heaters 886 and 888, and optical array 890. Each of these components is connected electrically, illustratively via cables 891, although other physical or wireless connections are within the scope of this invention. It is understood that computer 894 may be housed within instrument 800 or may be external to instrument 800. Further, computer 894 may include built-in circuit boards that control some or all of the components, and may also include an external computer, such as a desktop or laptop PC, to receive and display data from the optical array. An interface, illustratively a keyboard interface, may be provided including keys for inputting information and variables such as temperatures, cycle times, etc. Illustratively, a display 892 is also provided. Display 892 may be an LED, LCD, or other such display, for example.

Other instruments known in the art teach PCR within a sealed flexible container. See, e.g., U.S. Pat. Nos. 6,645,758, 6,780,617, and 9,586,208, herein incorporated by reference. However, including the cell lysis within the sealed PCR vessel can improve ease of use and safety, particularly if the sample to be tested may contain a biohazard. In the embodiments illustrated herein, the waste from cell lysis, as well as that from all other steps, remains within the sealed pouch. Still, it is understood that the pouch contents could be removed for further testing.

Turning back to FIG. 2, instrument 800 includes a support member 802 that could form a wall of a casing or be mounted within a casing. Instrument 800 may also include a second support member (not shown) that is optionally movable with respect to support member 802, to allow insertion and withdrawal of pouch 510. Illustratively, a lid may cover pouch 510 once pouch 510 has been inserted into instrument 800. In another embodiment, both support members may be fixed, with pouch 510 held into place by other mechanical means or by pneumatic pressure.

In the illustrative example, heaters 886 and 888 are mounted on support member 802. However, it is understood that this arrangement is illustrative only and that other arrangements are possible. Illustrative heaters include Peltiers and other block heaters, resistive heaters, electromagnetic heaters, and thin film heaters, as are known in the art, to thermocycle the contents of blister 864 and second-stage reaction zone 580. Bladder plate 810, with bladders 822, 844, 846, 848, 864, 866, hard seals 838, 843, 852, 853, and seals 871, 872, 873, 874 form bladder assembly 808, which may illustratively be mounted on a moveable support structure that may be moved toward pouch 510, such that the pneumatic actuators are placed in contact with pouch 510. When pouch 510 is inserted into instrument 800 and the movable support member is moved toward support member 802, the various blisters of pouch 510 are in a position adjacent to the various bladders of bladder assembly 810 and the various seals of assembly 808, such that activation of the pneumatic actuators may force liquid from one or more of the blisters of pouch 510 or may form pinch valves with one or more channels of pouch 510. The relationship between the blisters and channels of pouch 510 and the bladders and seals of assembly 808 is illustrated in more detail in FIG. 3.

Self-Contained Reaction Vessels and Methods

Figure 5A:
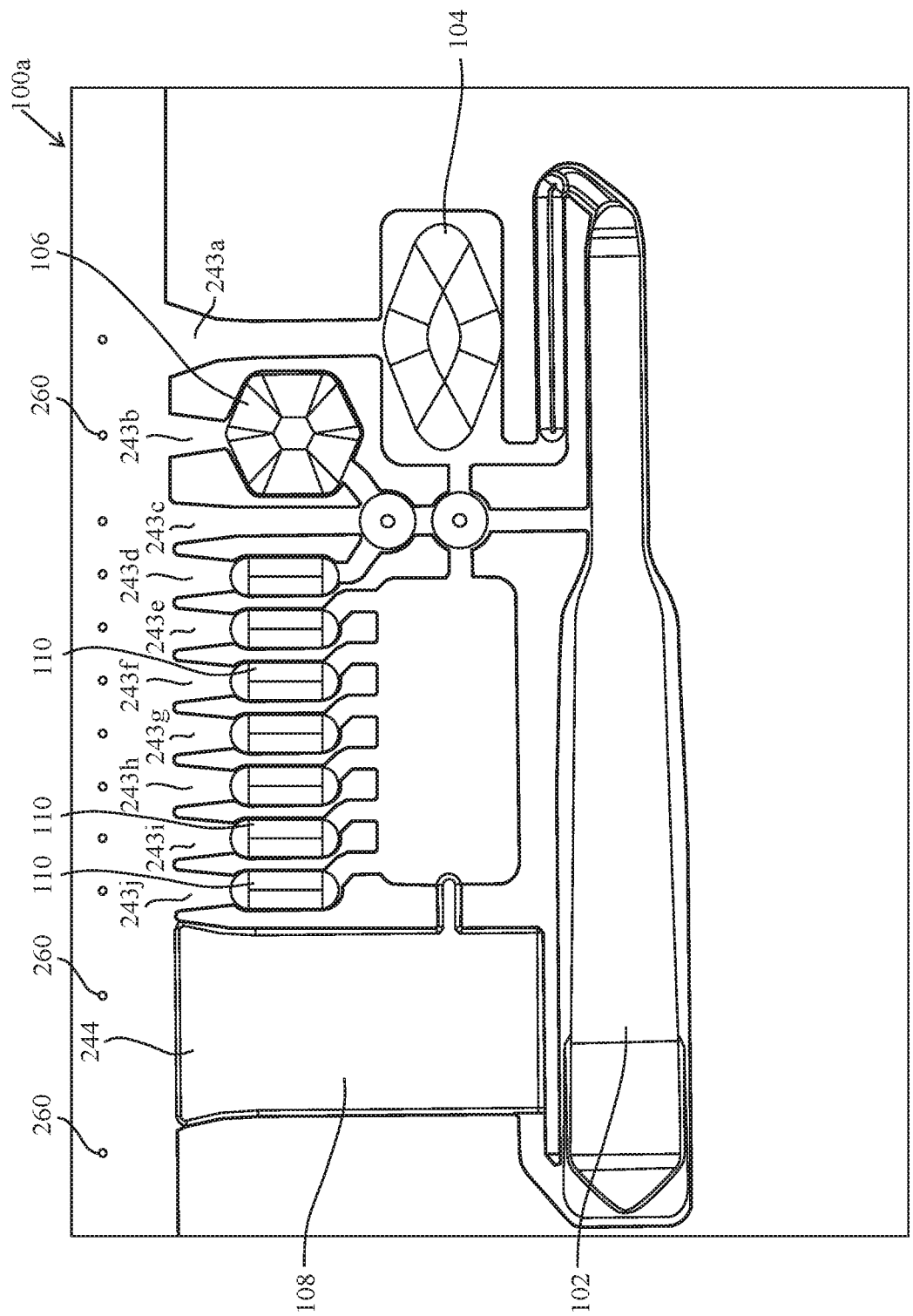
FIG. 5A shows another embodiment of a pouch, illustrating the pouch in an uncompleted state.
Figure 5B:
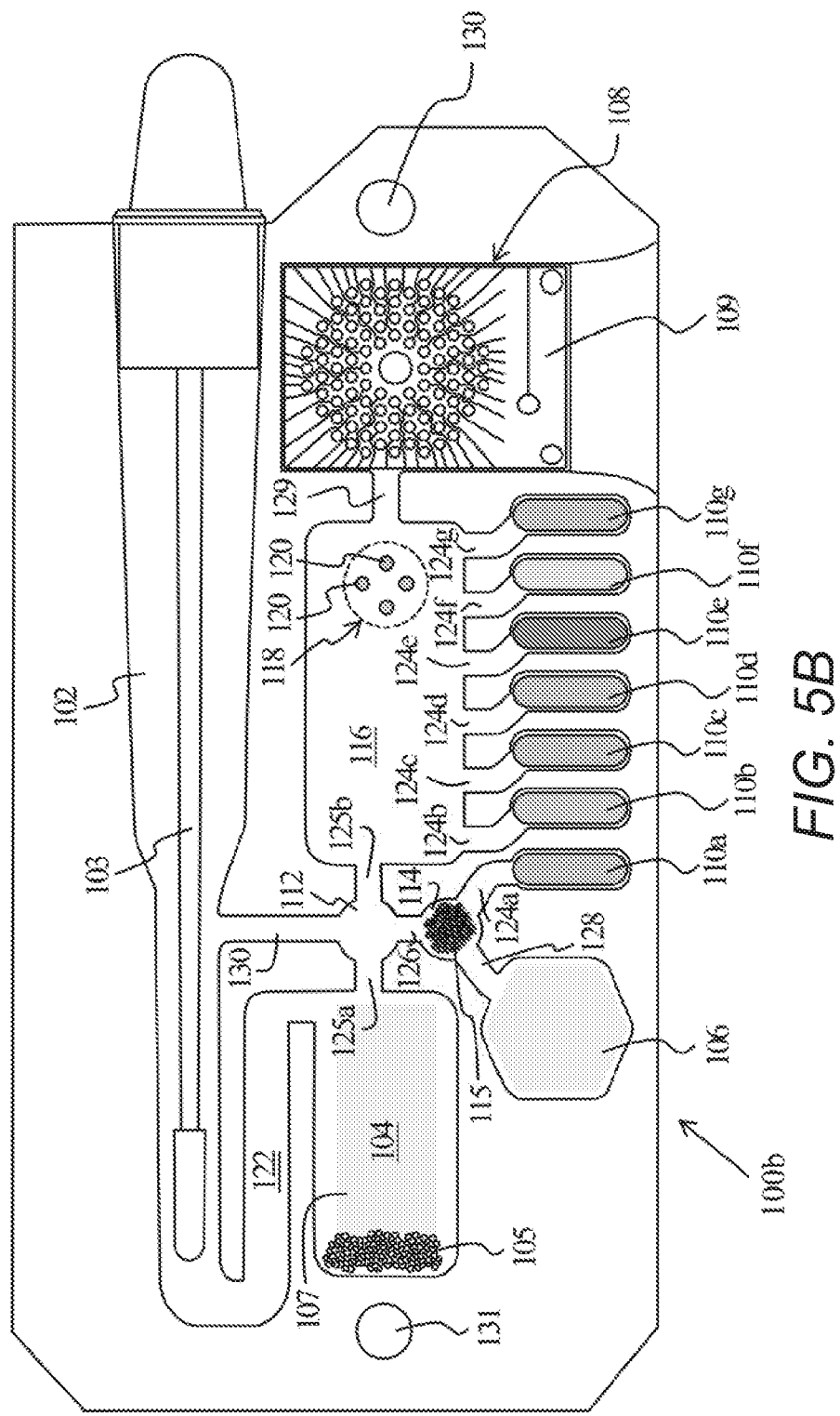
FIG. 5B shows another view of the pouch of FIG. 5A, illustrating the pouch in a completed state.

FIGS. 5A and 5B show another illustrative embodiment of a pouch 100a, 100b (also referred to herein as a reaction container, a reaction vessel, and/or a science card) that may be used in various embodiments, or may be reconfigured for various embodiments described herein for PCR, microbial testing, immunologic testing, or for a variety of other tests. FIG. 5A shows an example of an uncompleted pouch 100a and FIG. 5B shows an illustrative example of a completed pouch 100b with a sample collection swab 103, various reagents (e.g., lysis buffer 107 and lysis beads 105, magnetic beads 115, etc.), a second stage reaction array 109, and other components that may be added to pouch 100b at the time of manufacture. Pouch 100a, 100b shown in FIGS. 5A and 5B can be manufactured according to the methods described herein. Pouch 100a, 100b may be configured for use in an instrument described in U.S. Pat. Pub. No. 2019/0046989, herein incorporated by reference, or in a variety of other instruments, such as the instrument as described and shown above with reference to FIG. 2.

The illustrative pouch 100a, 100b of FIGS. 5A and 5B includes a number of zones or blisters where sample preparation, nucleic acid amplification, and detection can occur. The illustrative pouch 100a, 100b may include a sample input chamber 102, a sample preparation chamber 104, a sample wash reagent chamber 106, reactant recovery/wash chambers 112 and 114, a first reaction chamber 116, and a second reaction chamber 108, and one or more liquid reagent blisters 110a-110g that may be filled with aqueous reagents at the time of manufacture (as shown at pouch 100b of FIG. 5B). In some embodiments, one or more of the liquid reagents in, for example, blisters 110a-110g may be replaced with dried reagents that can be rehydrated at the time of use by liquid sample or other liquid reagents. Reagents in chambers and blisters 104, 106, 114, and 110a-110g may be added to pouch 100a, 100b at the time of manufacture through access channels 243a-243j (FIG. 5A) that are formed during the manufacturing process. Likewise, a second-stage reaction array 109 may be inserted into pouch 100a via opening 244. After reagents are added, these access openings 243a-243j and 244 may be sealed (e.g., heat sealed) to seal the reagents and second-stage array in pouch 100b. Because pouch 100a, 100b may be fabricated from barrier films that have very low rates of water vapor and oxygen transmission, aqueous liquid reagents and/or dried reagents in pouch 100b that may be added at the time of manufacture may be stable under ambient storage conditions for many months or a year or more (e.g., 3 months, 6 months, 1 year, or more). Pouch 100a, 100b may have any combination and configuration of chambers, blisters, and fluid channels. Below, adaptable methods for manufacturing an assay device having formed reaction chambers, blisters, channels, and the like from sheets of film material are described. In one example, the methods described herein can be used for manufacturing the pouch 100a, 100b. It is understood that such methods of manufacture may also be applied to devices having different configurations or different uses, such as any of the pouches or reaction containers described above or as described in U.S. Pat. Pub. No. 2020/0261914, the entirety of which is incorporated herein by reference.

The illustrative pouch 100a, 100b includes a fluidic circuit (i.e., an interconnected series of reaction chambers, channels, and the like in fluid communication) that can be used for fluid movement in the pouch 100a, 100b. In the illustrated example, the fluidic circuit of pouch 100a, 100b includes a series of fluidically connected chambers (e.g., 102, 104, 112, 114, 116, 108/109 etc.), blisters (e.g., 106 and 110a-110g) and channels (122, 125a, 125b, 128, 130, 124a-124g, and 129) illustratively for sample input, cell lysis and nucleic acid recovery, a first-stage PCR, a second-stage PCR, and detection of amplification. Channels 122, 125a, 125b, 128, 130, 124a-124g, and 129 may be sealed at the time of manufacture (e.g., by lamination of the pouch films), but such channels can be opened in use (e.g., by forcing fluid through the channels to peel apart the laminated films) to permit fluid movement between blisters and chambers. In an instrument designed to use pouch 100b for an assay, channel opening may be selectively controlled and opened channels may be reclosed with the use of hard seals that press on the exterior surface of the pouch and pinch off the channels (e.g., as described above with reference to FIG. 2).

The illustrative pouch 100b includes a sample input chamber 102 that may be used for inputting a sample into the pouch 100b. In one embodiment, the sample input chamber 102 includes and a swab 103. Illustratively, the swab 103 may be used for collecting a sample (e.g., from a throat or nasopharyngeal swab site) and then returned with sample thereon back into the sample input chamber 102, but this is illustrative only. In other embodiments, a variety of liquid, semi-liquid, semi-solid, and solid sample types may be introduced directly into the sample input chamber 102. For example, a transfer pipette or the like may be used for introducing a liquid sample (e.g., whole blood, positive blood culture, or urine) directly into the sample input chamber 102. Alternatively, swab 103 can be used to insert into the pouch 100b a sample previously collected by other means or devices. Sample input chamber 102 may be fluidically connected to a sample preparation chamber 104 via channel 122. Sample preparation chamber 104 may include a lysis buffer 107 and lysis beads 105 (e.g., zirconium silicate beads) that may be used for lysis of cells in a sample. In one embodiment, sample may be washed off of/recovered from swab 103 by flushing lysis buffer 107 through channel 122 back and forth between sample input chamber 102 and sample preparation chamber 104. Cells in the sample may be lysed in chamber 104 by agitating (e.g., bead beating) the sample, lysis buffer, and lysis beads in chamber 104 (e.g., such as described above with reference to FIGS. 1-4). If sample lysis is not needed, in some embodiments (not shown) the pouch 100b may include a reconfigured channel 122 that bypasses the sample preparation chamber 104 and that may be in direct fluid communication with chamber 112. In the illustrated embodiment, sample preparation chamber 104 is fluidically connected to chambers 112, 114, and 102 for, for example, nucleic acid recovery from the lysed sample and for waste disposal. In the illustrated embodiment, chamber 114 includes a quantity of magnetic silicate beads 115. The lysed sample may be mixed with the magnetic silicate beads 115 for nucleic acid recovery. For other embodiments, chambers 112 and 114 may contain other reagents (e.g., an immunologic capture reagent) for other types of assays. Following nucleic acid recovery, the magnetic silicate beads 115 may be recaptured (e.g., in blister 112 or 114) by a magnet (not shown) external to the pouch 100b and then washed with a wash buffer (for example, a wash buffer may be provided from blister 106). Depending on the assay, one or more washes may be performed. Following the wash(es), the magnetic beads may be recaptured by the magnet and the recovered nucleic acids may be eluted into chamber 106 with an elution buffer (for example, an elution buffer may be provided from blister 110a).

In one embodiment, the eluted nucleic acids in chamber 106 may be transferred to chamber 116 for a first-stage nucleic acid amplification reaction (e.g., a PCR reaction). Reagents for first-stage PCR may be pre-loaded in pouch 100b in liquid and/or dried form at the time of manufacture and may be introduced into chamber 116 from, for example, one or more of reagent blisters 110b-110g. In some embodiments, chamber 116 of pouch 100b may include dried reagents 118 in addition to or instead of the liquid reagents that may be provided from reagent blisters 110b-110g. In one example, some reagents may be more stable in dried form (e.g., reverse transcriptase, PCR primers, etc.) and may be, as a result, spotted onto the film and dried in spots 120 prior to lamination. In another example, one or more of the liquid reagents may be more storage-stable in the absence of one or more reaction components. In such cases, the reaction component(s) may be spotted onto one of the layers of film at the time of manufacture. An illustrative process for spotting, drying, and incorporating such dried reagents into an assay device will be described below in reference to the manufacturing method(s) described herein. If such spots 120 are present, they may be rehydrated when the sample and/or the liquid reagents are introduced into chamber 116.

After the first-stage nucleic amplification reaction, a portion of the product may be removed (e.g. plunged) from chamber 116 and a dilution solution and second-stage nucleic acid amplification reagent (e.g., PCR reagents) may be added to chamber 116 from, for example, one or more of reagent blisters 110b-110g. The mix for the second-stage nucleic acid amplification reaction (e.g., a PCR reaction) may then be introduced into the wells of card 109 of chamber 108 for the second-stage nucleic acid amplification reaction and detection of amplified targets. Additional discussion of such pouches or reaction containers and their uses described above may be found in U.S. Pat. Pub. No. 2019/0046989 or U.S. Pat. Pub. No. 2020/0261914, the entireties of which were already incorporated herein by reference.

Illustratively, pouch 100a, 100b may be formed of two or more layers of a flexible plastic film or other flexible material such as polyester, polyethylene, polyethylene terephthalate (PET), polycarbonate, polypropylene (PP), polymethylmethacrylate, mixtures, combinations, and layers thereof that can be made by any process known in the art, including extrusion, plasma deposition, and lamination. For instance, each layer can be composed of one or more layers of material of a single type or more than one type that are laminated or fused together. One operative example is a bilayer plastic film that includes a PET layer and a PP layer. In one embodiment, flexible polymeric material having a thickness in a range of about 0.02 mm to about 0.1 mm is used. Metal foils or plastics with aluminum lamination also may be used. Illustratively, the material has low nucleic acid binding and low protein binding capacity. If plastic film is used, selected portions of the film layers may be bonded together, illustratively by heat sealing or laser welding. If fluorescence detection is used, optically transparent material may be used in the appropriate areas of the pouch (e.g., in the vicinity of the second-stage array).

In some embodiments, a barrier film may be used in one or more of the layers used to form the pouch 100a, 100b. For instance, barrier films may be desirable for some applications because they have low water vapor and/or oxygen transmission rates that may be lower than conventional plastic films. Because liquid reagents may be provided in pouch 100b at the time of manufacture, the low water vapor and/or oxygen transmission rates that are associated with barrier films can prevent evaporation of water from the reagents and prevent oxidation of reagents between the time of manufacture and the time of use (e.g., up to three months, up to six months, up to one year, or more). Similarly, because certain dried reagents may be provided in pouch 100b at the time of manufacture, the low water vapor and/or oxygen transmission rates that are associated with barrier films can also prevent degradation of these dried reagents because environmental water and oxygen are less able to penetrate the pouch between the time of manufacture and the time of use. In one example, typical barrier films may have water vapor transmission rates (WVTR), as measured, for example, according to ASTM F1249, as low as 0 $g/m^2/24$ hrs (i.e., the WVTR may be too low to be measured by ASTM F1249), or a WVTR in a range of 0 $g/m^2/24$ hrs to about 3 $g/m^2/24$ hrs (e.g., about 0.01 $g/m^2/24$ hrs to about 3 $g/m^2/24$ hrs), preferably in a range of about 0.05 $g/m^2/24$ hrs to about 2 $g/m^2/24$ hrs (e.g., no more than about 1 $g/m^2/24$ hrs) and oxygen transmission rates, as measured, for example, according to ASTM D3985, as low as 0 $cc/m^2/24$ hrs (i.e., the oxygen transmission rate may be too low to be measured by ASTM D3985), or an oxygen transmission rate in a range of 0 $cc/m^2/24$ hrs to about 2 $cc/m^2/24$ hrs (e.g., about 0.01 $cc/m^2/24$ hrs to about 2 $cc/m^2/24$ hrs), preferably in a range of about 0.05 $cc/m^2/24$ hrs to about 2 $cc/m^2/24$ hrs (e.g., no more than about 1 $cc/m^2/24$ hrs). Examples of barrier films include, but are not limited to, films that can be metallized by vapor deposition of a metal (e.g., aluminum or another metal) or sputter coated with an oxide (e.g., $Al_2O_3$ or $SiO_x$) or another chemical composition. A common example of a metallized film is aluminized Mylar, which is metal coated biaxially oriented PET (BoPET). In some applications, coated barrier films can be laminated with a layer of polyethylene, PP, or a similar thermoplastic, which provides sealability and improves puncture resistance. As with conventional plastic films, barrier films layers used to fabricate a pouch may be bonded together, illustratively by heat sealing. Illustratively, the material has low nucleic acid binding and low protein binding capacity. Other barrier materials are known in the art that can be sealed together to form the blisters and channels.

Figure 14:
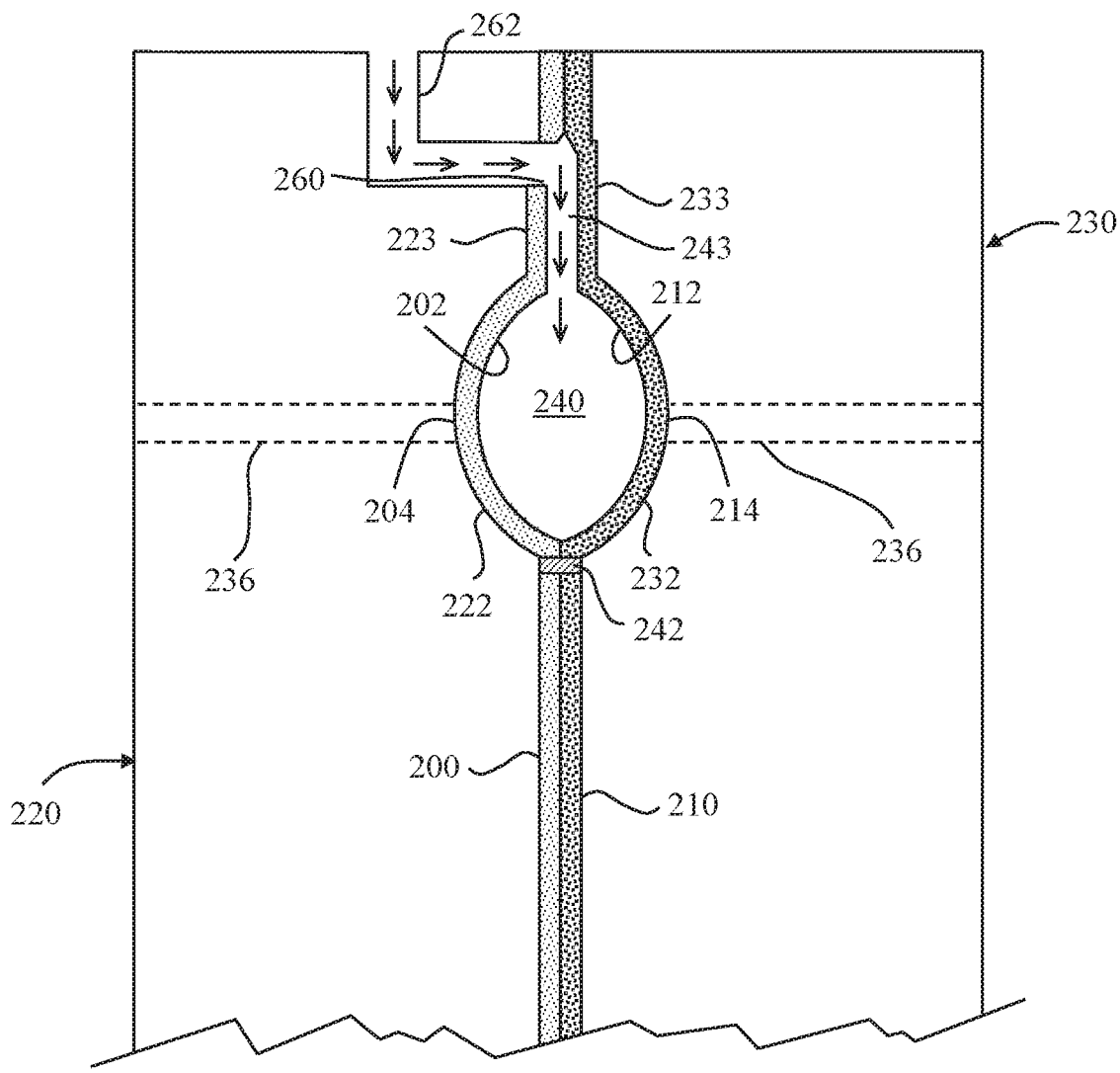
FIG. 14 is a schematic cross-sectional illustration of a compressed fluid being propelled between the polymeric sheets of FIG. 13 to form chambers in the pouch.

In one embodiment, a first polymeric sheet 200 (e.g., a layer of a flexible plastic film or other flexible material as described above) includes a first inner planar face 202 and a first outer planar face 204 (see, e.g., FIG. 14). A second polymeric sheet 210 (e.g., a layer of a flexible plastic film or other flexible material as described above) includes a second inner planar face 212 and a second outer planar face 214. Illustratively, at least one of the first polymeric sheet 200 and the second polymeric sheet 210 can include a barrier film or other water vapor and/or oxygen barrier material. In one embodiment, both the first polymeric sheet 200 and the second polymeric sheet 210 include a barrier film or other water vapor and/or oxygen barrier material. In one embodiment, the first and second polymeric sheets 200, 210 are formed as one piece, such that the first inner planar face 202 and the second inner planar face 212 are contiguous, and the first outer planar face 204 and the second outer planar face 214 are contiguous. For example, the first and second polymeric sheets 200, 210 can be formed from one polymeric sheet that is folded onto itself (e.g., folded in half). In another embodiment, the first and second polymeric sheets 200, 210 are separate polymeric sheets joined together (e.g., laminated together) and reformed according to the methods described herein to form the pouch 100a, 100b. Illustratively, the first and second polymeric sheets 200 and 210 may include a PET outer layer, an aluminized barrier layer or a "clear" barrier layer (e.g., an aluminum oxide or silicon oxide sputter coated coated barrier) and an inner PP layer. Preferably, the first polymeric and second polymeric sheets 200 and 210 may have a WVTR in a range of about 0 $g/m^2/24$ hrs to about 3 $g/m^2/24$ hrs (e.g., 0.1 $g/m^2/24$ hrs or less). Typically, aluminized barrier layers offer greater barrier properties as compared to sputter coated metal oxide "clear" barrier layers, but both offer significantly greater barrier properties that similar films without barrier layers. Illustratively, the first polymeric sheet 200 may include a polyester (e.g., PET) outer layer, an aluminized barrier layer, and a PP inner layer. Illustratively, the second polymeric sheet 210 may include a polyester (e.g., PET) outer layer, a sputter coated metal oxide "clear" barrier layer, and a PP inner layer.

In one embodiment, one or more polymeric sheets may be used to form a reaction container (e.g., pouch 100a, 100b). The polymeric sheets include an inner planar face that forms the inside of the reaction container and an outer planar face that forms the outside surface of the reaction container. In the above examples, the polypropylene (PP) layer forms the inside of the reaction container and the polyester layer forms the outside of the reaction container. This is only illustrative, however; the materials that form the inside and outside surfaces of the reaction container may be varied depending on the application, but the methods described herein may be adapted for fabrication of a reaction container from any polymeric sheet material.

In one embodiment, one polymeric sheet may be used to form a reaction container (e.g., pouch 100a, 100b). For example, a polymeric sheet (e.g., polymeric sheet 200 or polymeric sheet 210) may be folded onto itself (e.g., folded in half) so that the inner planar faces of the two parts of the folded sheet contact each other. In another embodiment, the first and second polymeric sheets 200 and 210 may be used to form a reaction container. In one embodiment, a method of forming a reaction container may include steps of providing the polymeric sheets 200, 210 (i.e., one folded sheet or a first polymeric sheet and a second polymeric sheet), contacting the inner planar faces of the polymeric sheets, pressing the polymeric sheets between a first forming plate and a second forming plate, and propelling a compressed fluid between the inner planar faces of the polymeric sheets while the polymeric sheets are pressed between the forming plates to reform selected portions of the polymeric sheets into one or more shapes defined by the forming plates. In one embodiment, at least one of the first or second forming plates has one or more recesses for forming one or more reaction chambers, fluid flow channels, reagent chambers, or sample chambers in selected portions of the polymeric sheets. That is, when the compressed fluid is forced between the inner planar faces of the polymeric sheets, the polymeric sheets can expand outward into the spaces defined by the forming plates. When the pressure is released, the selected areas of the polymeric sheets that were expanded into the forming plates retain the shape(s) (e.g., reaction chambers, sample chambers, reagent blisters, etc.) defined by the forming plates.

In some embodiments, the polymeric sheets (i.e., the folded polymeric sheet or the first and second polymeric sheets) may be laminated to one another (i.e., reversibly sealed to one another) prior to the pressing and propelling steps. For example, the polymeric sheets may be pressed between hot plates or between heated rollers to reversibly seal the inner planar faces to one another. In the example described above, the inner polypropylene layers of the sheets may be heated and pressed together such that the opposing polypropylene layers are sealed to one another, but sealed in such a way that the sheets can be peeled apart (i.e., the sheets are reversibly sealed together). In the specific embodiment where the opposing polypropylene layers are reversibly sealed to one another, the lamination may occur at a temperature in a range of about 110° C. to about 130° C. (e.g., 120° C.). In a specific embodiment, the polymeric sheets may be passed between heated rollers at a temperature of about 110° C. to about 130° C. to reversibly seal the inner planar faces of the sheets together. In one example, the heated rollers exert a pressure of approximately 10 PSI to 100 PSI (~0.07 MPa to ~0.7 MPa) (e.g., about 40-50 PSI) and the sheets are exposed to the temperature of about 110° C. to about 130° C. for approximately 0.05 to 0.5 seconds (e.g., 0.1 seconds). In some embodiments, the time/temperature/pressure parameters may be adjusted for different film materials and/or to create reversible seals having different peel strengths.

As discussed herein above, pouch 100b may include dried reagent spots 120. In one embodiment, liquid reagents may be spotted onto at least one of the first and second polymeric sheets 200, 210 and then dried (e.g., air dried) prior to laminating the first and second polymeric sheets. In one embodiment, liquid reagents may be added dropwise onto at least one of the first and second polymeric sheets 200, 210 and the liquid may be subsequently air dried. The liquid may be spotted onto the film manually or with the aid of a liquid handling robot. In one embodiment, the liquid reagents may be spotted onto the films with a modified ink jet printer head. In one embodiment, the spotted reagents may be electrostatically transferred to the film layer as dried powder in a process similar to laser printing or photocopying. This would eliminate the need to dry the reagent prior to lamination.

In some embodiments, one or more seal lines may be formed on the polymeric sheets prior to the pressing and propelling steps. In one embodiment, the one or more seal lines define boundaries of a fluidic circuit (i.e., an interconnected flow path) that can be used for fluid movement in the reaction container (e.g., pouch 100a, 100b). In one embodiment, the fluidic circuit may include one or more reaction chambers, fluid flow channels, or sample chambers (e.g., as described above with reference to FIGS. 5A and 5B). In one embodiment, the one or more seal lines may be formed by a heat-sealing apparatus, a laser-welding apparatus, a sonic welding apparatus, or other apparatuses known in the art. Suitable examples of heat sealing apparatuses include, but are not limited to, heated plates that have lines that define the fluidic circuit formed thereon. For example, metal plates with raised, hot portions tracing the fluidic circuit may serve to permanently seal the polymeric sheets to one another in select areas to define the boundaries of the fluidic circuit. In one embodiment, such plates may have cooler regions between the seal lines (cooler regions may be filled, for example, with syntactic foam or the like) such that only the seal lines are sealed. Likewise, examples of laser welding apparatuses are well known in the art. An example of a laser welding apparatus may include a laser with a wavelength chosen to weld the polymeric sheets together to create permanent seal lines and a computer controller that can be programmed to control the path of the laser. In one embodiment, the first and second polymeric sheets may be laminated to one another and then one or more seal lines may be formed to define the fluidic circuit prior to the pressing and propelling steps. In some embodiments, boundaries of the seal lines may correspond to the shapes in the forming plates such that the seal lines and the forming plates define the reformed shapes when the compressed fluid is propelled between the polymeric sheets. The polymeric sheets that include openings formed by the compressed fluid and the forming plates can be removed from the forming plates, and the manufacture of the reaction container can be completed by inserting reagents (e.g., lysis components, wash reagents, PCR reagents, etc.) into the correct blisters and chambers that have been formed.

Figure 6:
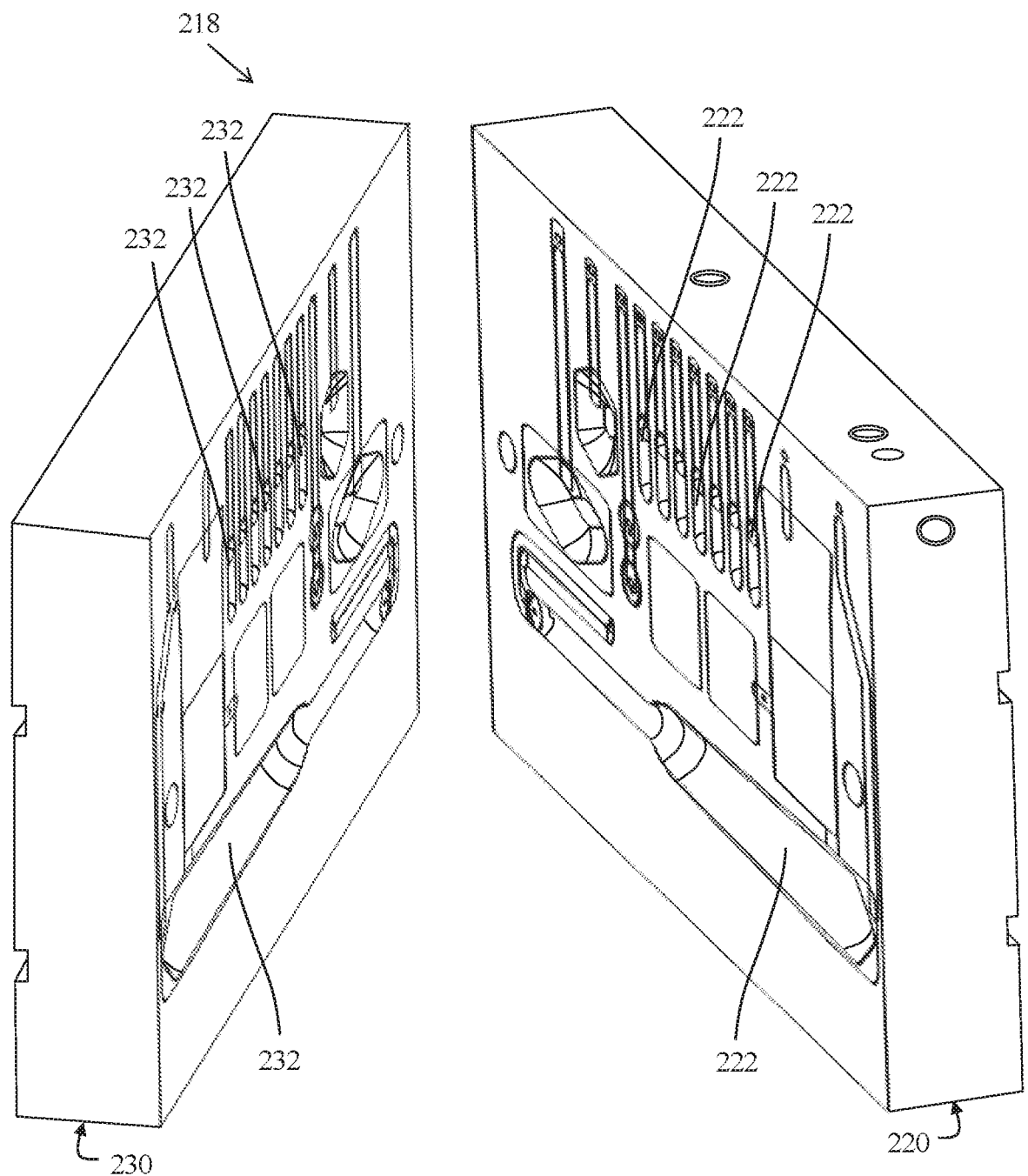
FIG. 6 shows a separated view of a forming die used during manufacture of the pouch shown in FIGS. 5A and 5B.
Figure 7:
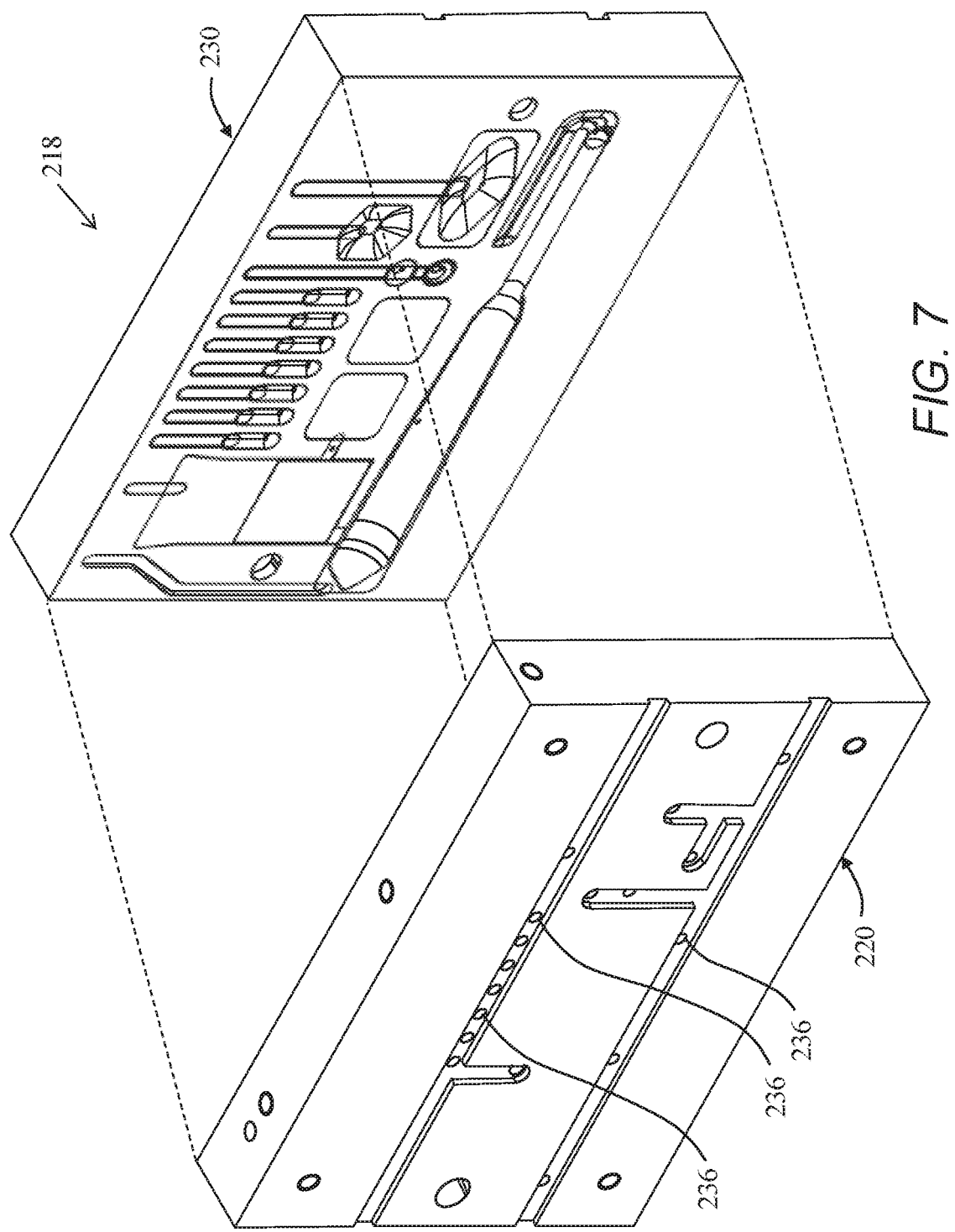
FIG. 7 is a separated perspective of the forming die.
Figure 8:
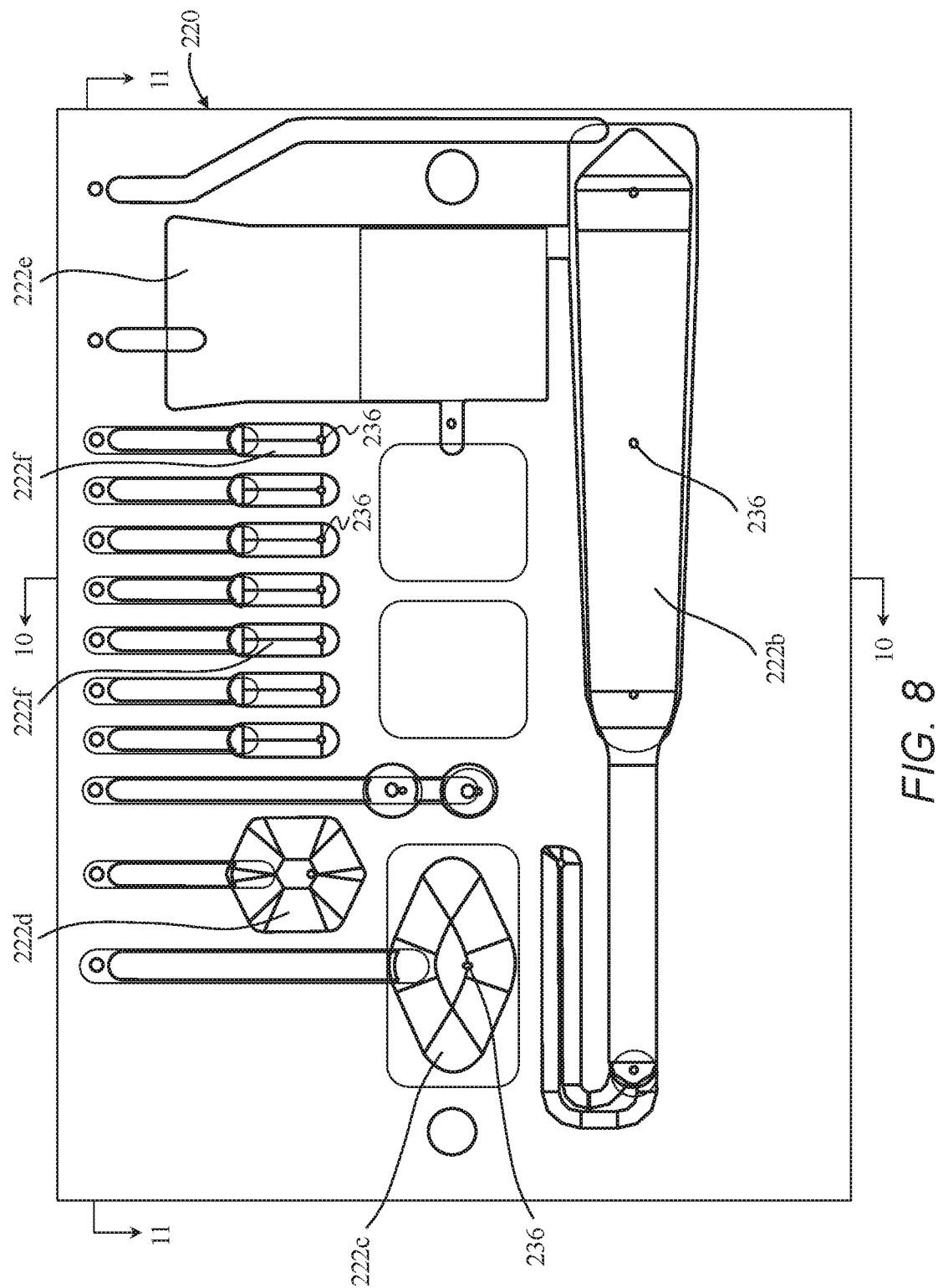
FIG. 8 is a front elevation of a first forming plate of the forming die of FIG. 6.
Figure 9:
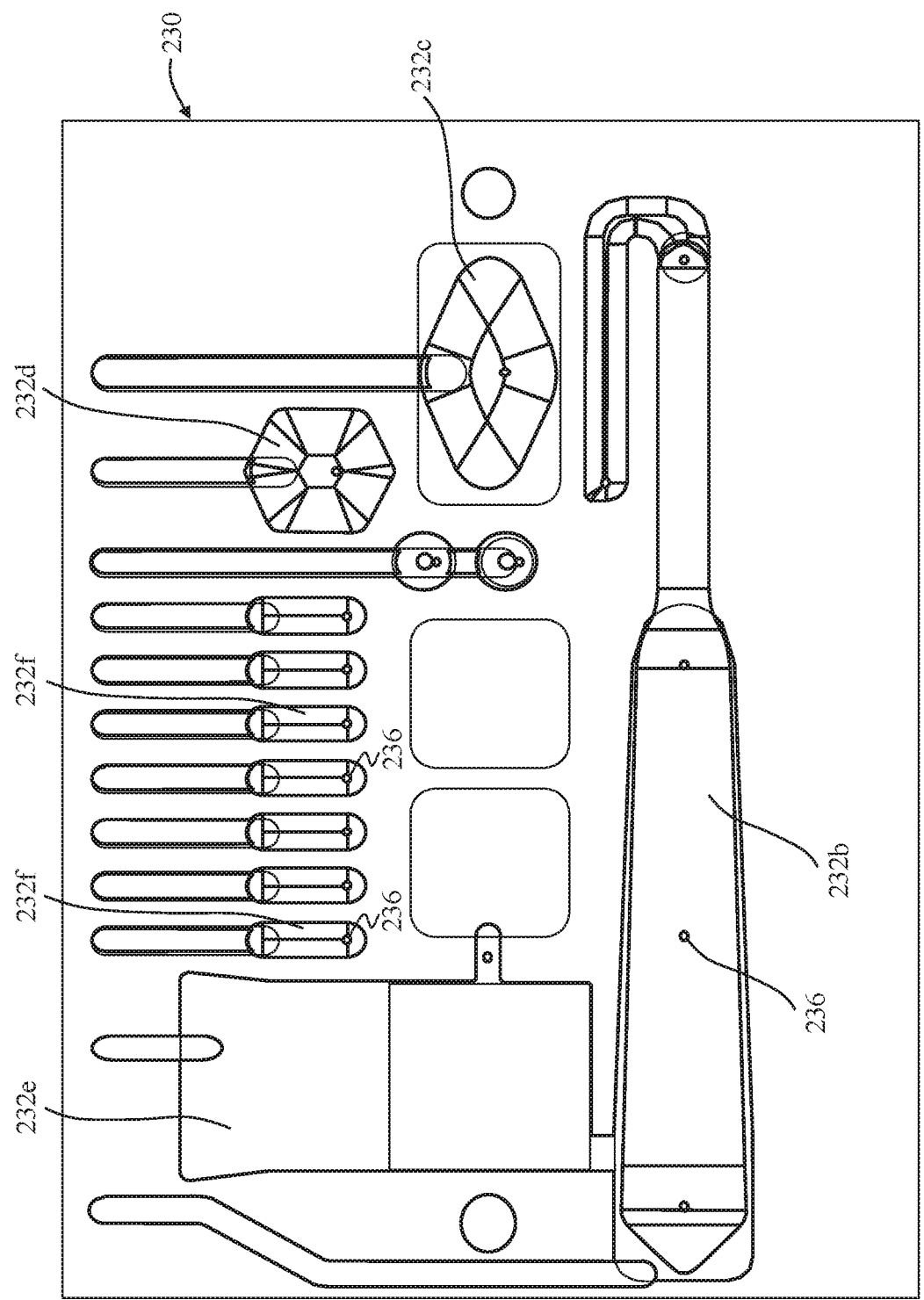
FIG. 9 is a front elevation of a second forming plate of the forming die of FIG. 6.
Figure 13:
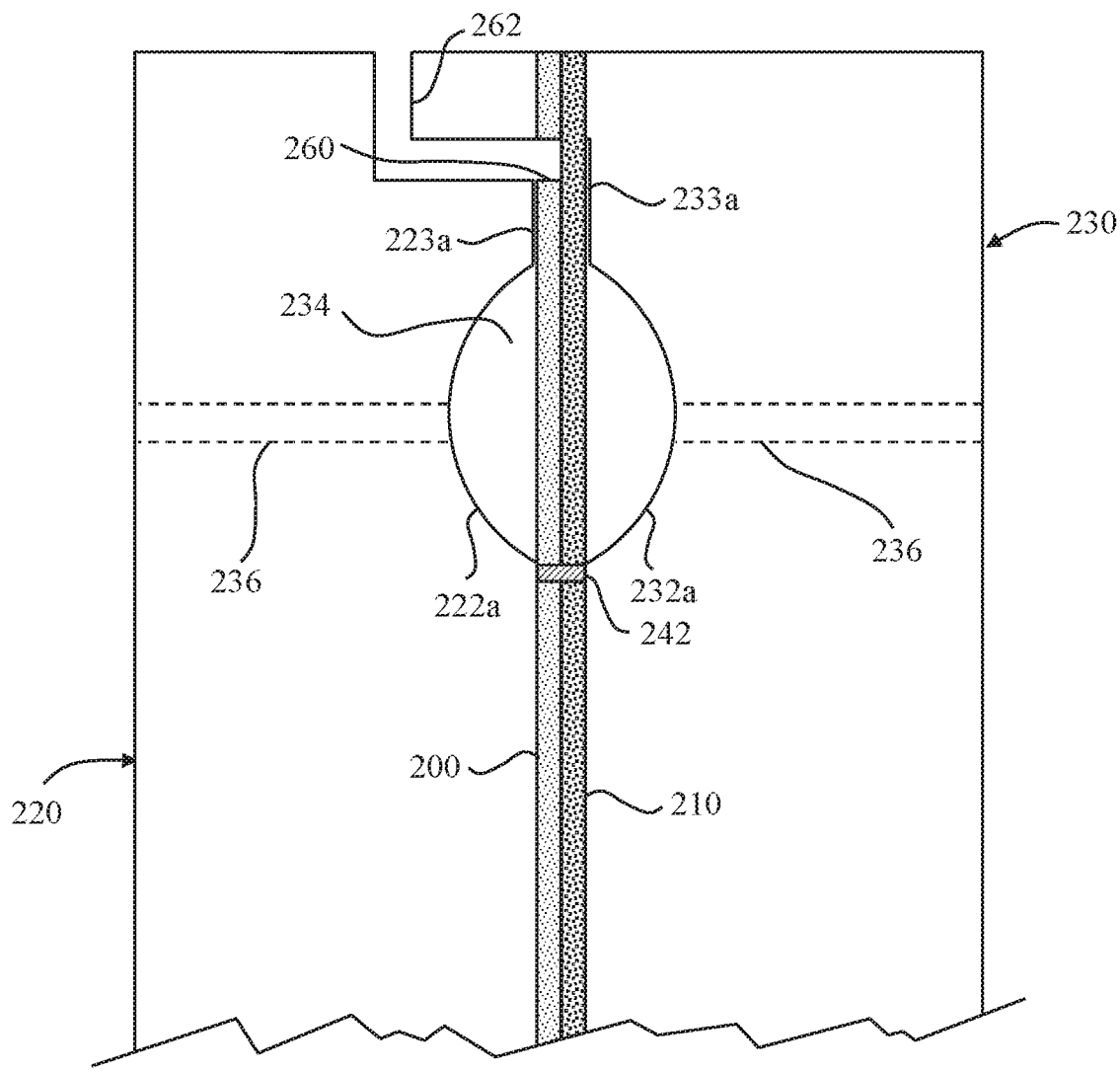
FIG. 13 is a schematic cross-sectional illustration of polymeric sheets pressed between the forming plates to form the pouch.

Referring to FIGS. 6 and 7, a forming die 218 includes a first forming plate 220 and a second forming plate 230. The first and second forming plates 220, 230 of the forming die 218 are configured and dimensioned to be pressed or clamped together to form the polymeric sheets 200, 210 into a reaction container (e.g., pouch 100a, 100b). The first forming plate 220 includes one or more recesses 222. The second forming plate 230 includes one or more recesses 232. Illustratively, recesses 222 are substantially aligned with recesses 232 when the first and second forming plates 220, 230 are pressed together so as to create forming chambers. For example, as shown in FIGS. 8-9, recesses 222 are substantially a mirror image of and aligned with recesses 232. As shown in FIG. 13, illustrative recess 222a is substantially a mirror image of and aligned with illustrative recess 232a such that when the first and second forming plates are pressed together a forming chamber 234 is defined. The recesses 222, 232 are shaped so as to reform portions of the first and second polymeric sheets 200, 210 into desired shapes to form the applicable chambers (e.g., reagent reservoirs, sample preparation chambers, etc.). Other configurations are within the scope of the present invention, such as recesses that create asymmetrical forming chambers. For instance, while recesses 222a and 232a of FIG. 13 are shown as substantial mirror images, they may have different shapes or different depths in some embodiments. For example, it may be preferable in some embodiments to reform one type of polymeric sheet more than another. In an illustrative example, it may be preferable to reform one barrier film more than another because one barrier may be more or less susceptible to degradation of barrier properties as a result of the reforming process described herein. In another illustrative example, it may be preferable to reform one film material more than another because the films have different stretch properties—e.g., different abilities to be stretched and reformed. As such, in one illustrative example, only one forming plate may include recesses such that only one of the film materials is reformed. Other configurations are within the scope of the present invention.

The forming chambers defined between the first and second forming plates 220, 230 (e.g., such as forming chamber 234 defined by recesses 222a and 232a, illustrated in FIG. 13) are arranged to form the blisters, chambers, and/or channels in a reaction container (e.g., pouch 100a, 100b). For example, in the illustrated embodiment as best seen in FIGS. 8-9, recesses 222b, 232b align to create a forming chamber for the sample input chamber 102. Recesses 222c, 232c align to create a forming chamber for the sample preparation chamber 104. Recesses 222d, 232d align to create a forming chamber for the sample reagent wash chamber 106. Recesses 222e, 232e align to create a forming chamber for reaction chamber 108. Recesses 222f, 232f align to create a forming chamber for reagent blisters 110. In the illustrated embodiment, each of the recesses 222, 232 includes at least one vent hole 236 for venting air expelled from the respective recess during forming of the reaction container, as will be described in further detail below. Other configurations are within the scope of the invention, such as different recess and forming chambers that may be required depending on the configuration of the reaction container or pouch.

In one embodiment, the first inner planar face 202 and the second inner planar face 212 of the film layers 200 and 210 are contacted and pressed between the first forming plate 220 and the second forming plate 230. Subsequent to pressing film layers 200 and 210 between forming plates 220 and 230, a compressed fluid (e.g., compressed gas, compressed air, compressed liquid, or other suitable compressed fluid) may be propelled between the first and second inner planar faces 202, 212. The compressed fluid forces portions of the first and second polymeric sheets 200, 210 into the respective recesses 222, 232, thereby forming an opening or hollow area 240 between the first and second polymeric sheets (for example, reforming the polymeric sheets to include the opening or hollow area between the sheets) (see, e.g., FIGS. 13 and 14). This opening or hollow area 240 illustratively can be a blister, a chamber, and/or a channel in the pouch 100a, 100b. If the polymer sheets have been laminated prior to pressing the film layers between the forming plates, the compressed fluid peels the sheets apart in the selected portions to form the hollow area according to the structure of the forming plates, as described in further detail below. Alternatively, the films may not be laminated together prior to pressing and reforming. As the compressed fluid forces portions of the polymeric sheets 200, 210 into the recesses 222, 232, any air that is displaced from the recesses can exit the forming plates 220, 230 through the at least one vent hole 236 in each recess. Each vent hole 236 vents to outside the respective forming plate 220, 230 (see, e.g., FIG. 10).

Figure 10:
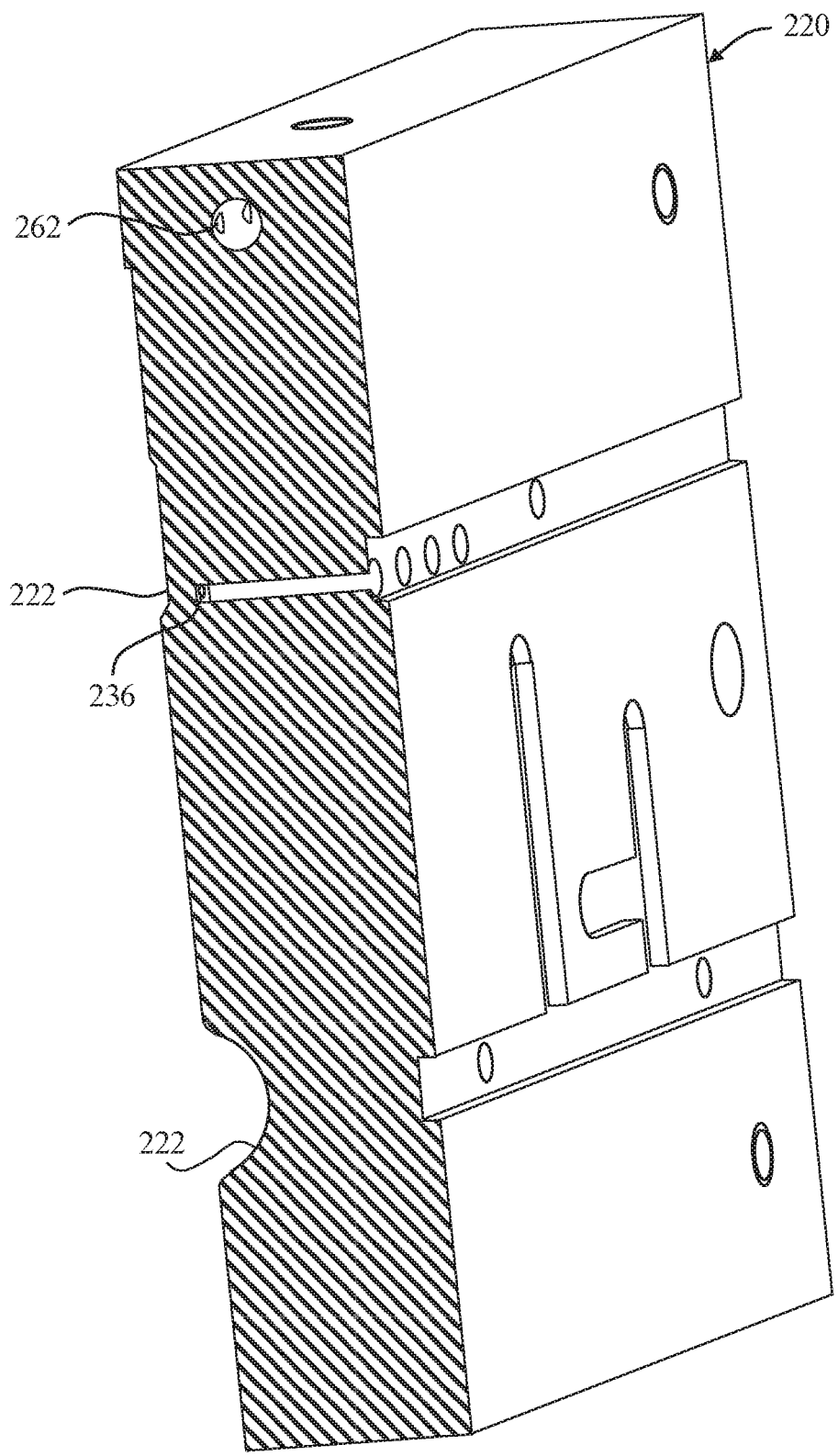
FIG. 10 is a cross sectional perspective of the first forming plate taken along line 10-10 of FIG. 8.
Figure 11:
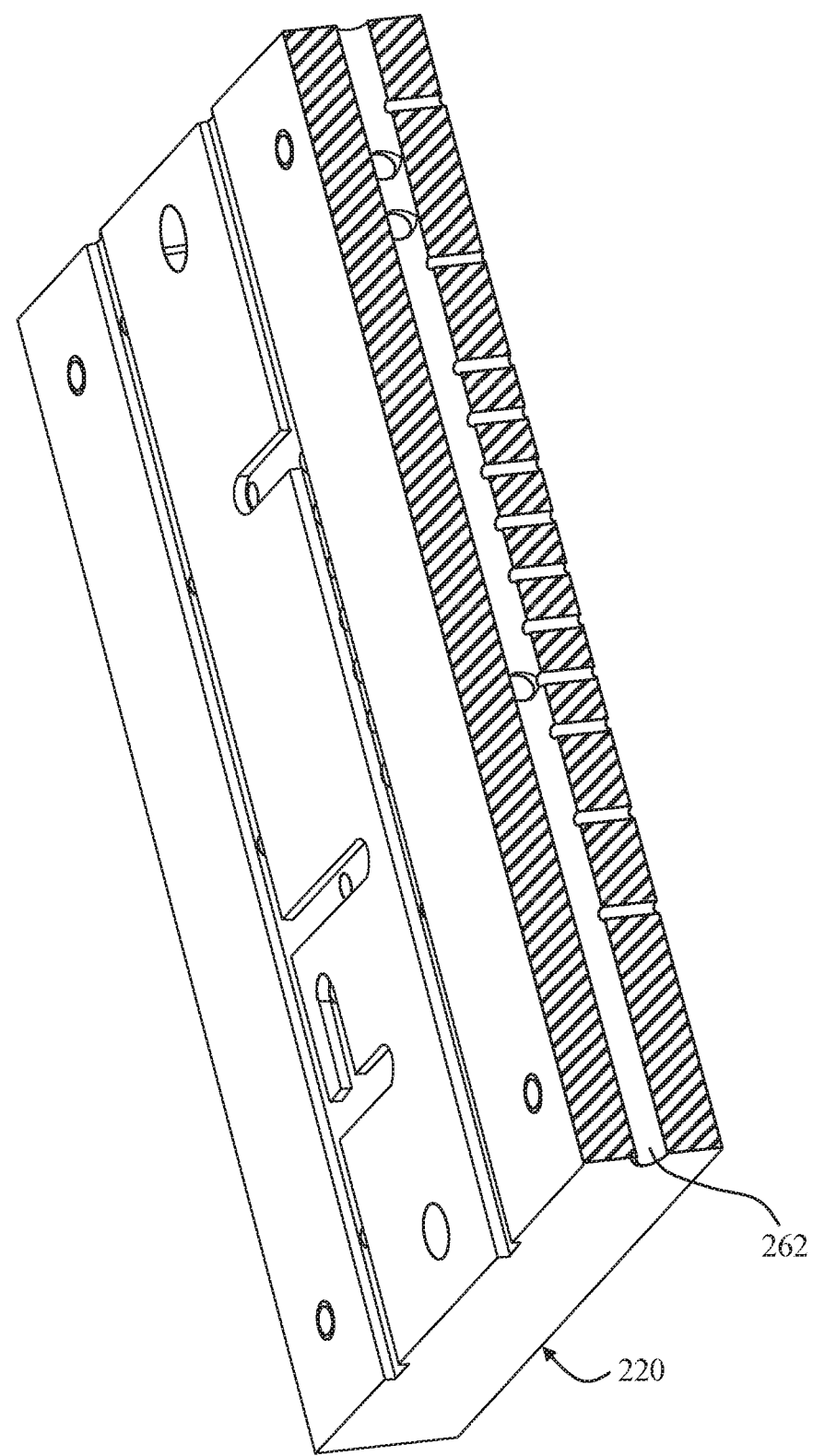
FIG. 11 is a cross sectional perspective of the first forming plate taken along line 11-11 of FIG. 8.
Figure 12:
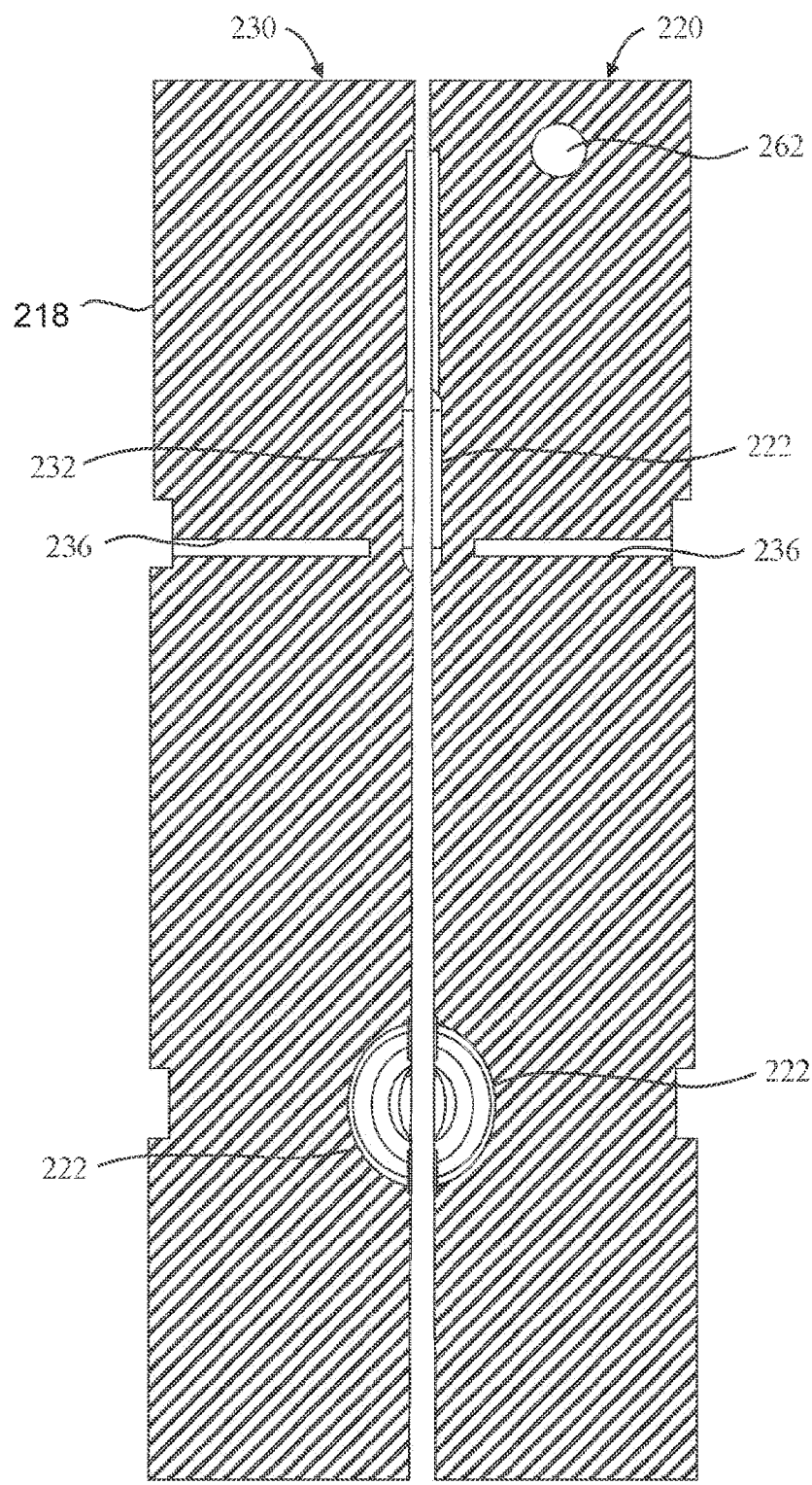
FIG. 12 is a cross section of the first and second forming plates pressed together.

In one embodiment, as shown in FIGS. 5A, 13, and 14, one or more holes 260 may be cut in one of the first and second polymeric sheets 200, 210. In the illustrated embodiment, holes 260 are cut in the first polymeric sheet 200 but not in the second polymeric sheet 210, although the reverse or having some holes in each of the sheets are possible and other configurations are within the scope of the present invention. The holes 260 permit fluid communication for a compressed fluid source to between the first and second polymeric sheets 200, 210. As best seen in FIGS. 10-11, the forming die 218 includes one or more conduits 262 in fluid communication with the holes 260 (see, e.g., FIG. 11). As illustrated in FIG. 13, polymeric sheets 200 and 210 may be compressed between plates 220 and 230 such that hole(s) 260 are aligned with conduit 262.

As shown in FIG. 14, compressed fluid (illustrated by the arrows) from a compressed fluid source (not shown) enters the forming die 218 and travels through a conduit 262 to a respective hole 260 in the first polymeric sheet 200 to be propelled between the first polymeric sheet and the second polymeric sheet 210. In the illustrated embodiment, the first polymeric sheet 200 includes a hole 260 corresponding to each opening or hollow area 240 that must be formed in the pouch 100a, 100b (e.g., there is a hole 260 corresponding to each blister, chamber, and/or channel that will be formed by the compressed fluid and the forming die). The forming die 218 includes conduits 262 in fluid communication with each hole 260 so that compressed fluid can be propelled into each hole and between the first and second polymeric sheets 200, 210 to each location where an opening 240 must be formed (e.g., to opening 240 from hole 260). As shown in FIGS. 13 and 14, the forming plates 220 and 230 may include shallow cut-out regions 223a and 233a adjacent to conduit 262 such that the film layers 200 and 210 can expand adjacent to conduit 262, as shown at 223 and 233, so that the compressed fluid can flow between the layers and expand the film to form opening 240. Illustratively, the conduit and hole configuration permits all of the openings to be formed simultaneously or substantially simultaneously. The channels connecting the holes 260 to the reformed openings 240 may subsequently be used to inject fluids (e.g., reagents) into the reaction container (e.g., pouch 100a, 100b). For example, the area that was expanded around 223 and 233 may form an access channel 243 that can be used to inject fluids (e.g., reagents) into opening 240.

Illustratively, the first and second polymeric sheets 200, 210 may be laminated together prior to being pressed or clamped between the forming plates 220, 230. Illustratively, the lamination may reversibly adhere the sheets 200, 210 together, allowing for ease of handling but still allowing for formation of the blisters, chamber, and channels therebetween. In embodiments where the films are laminated, the compressed fluid can also peel apart the lamination so that the compressed fluid can flow between layers 200, 210 and expand the film to form opening 240. Furthermore, the first and second polymeric sheets 200, 210 may be sealed at certain locations prior to being pressed or clamped between the forming plates 220, 230. For example, one or more seal lines may be made to join the first and second polymeric sheets 200, 210 to define each opening or hollow area 240 that will be formed between the sheets. As shown in cross section in FIGS. 13 and 14, film layers 200 and 210 may include a seal line 242 (e.g., a laser weld line) that joins film layers 200 and 210 adjacent to the opening defined by recesses 222a and 232a. In the illustrated cross section, only one edge of the seal line 242 is visible but, as explained elsewhere herein, the seal line may trace around and define the boundaries of opening 240. In one embodiment, film layers 200 and 210 may be laminated to one another prior to forming heat seals (e.g., heat seal 242) and prior to clamping the film layers 200 and 210 between plates 220 and 230. Suitably, the seal lines may be formed by laser welding, heat sealing, sonic welding, or other suitable sealing method. Preferably, the seal lines generally align with respective recess pairs 222, 232 of the forming plates 220, 230 when the sheets 200, 210 are pressed between the plates.

In one embodiment, a laminated polymeric sheet comprising first and second polymeric sheets 200, 210 may be joined with the one or more seal lines (e.g., laser welds) to join the first and second polymeric sheets and define a configuration of blisters, chambers, and/or channels (i.e., a fluidic circuit). Holes 260 may be cut in the first and/or second polymeric sheets 200, 210 during the same laser welding operation or at a different time. In addition, one or more alignment holes (130 and 131, FIG. 5B) for aligning the sheets and laser weld lines in the forming plates may be cut in the first and/or second polymeric sheets 200, 210 during the same laser welding operation or at a different time. The laminated and laser-welded polymeric sheets 200, 210 may then be pressed or clamped in the forming die 218 such that the holes 260 (which are also pressed in the forming die) are each in fluid communication with respective conduits 262. In addition, the seal lines joining the first and second polymeric sheets 200, 210 may generally align with respective recesses 222, 232 in the first and second forming plates 220, 230 of the forming die 218. A compressed fluid is then propelled through the conduits 262, into the respective holes 260, and between the first and second polymeric sheets 200, 210. The compressed fluid is propelled directly on the inner planar surfaces 202, 212 of the first and second polymeric sheets 200, 210. The compressed fluid expands selected areas of the first and second polymeric sheets 200, 210 into channel formers 223a and 233a and forming chambers 234 formed by aligned recess pairs 222, 232 to form openings 240 between the first and second polymeric sheets.

Displaced air is vented from the recesses 222, 232 through respective venting holes 236. The openings 240 generally correspond to the seal lines previously made to join the first and second polymeric sheets together. In one embodiment, films 200 and 210 may be expanded into forming chambers 234 at a constant pressure. In another embodiment, films 200 and 210 may be expanded into forming chambers 234 at a variable pressure. For example, film expansion may be started at an initial pressure of about 10 PSI (~0.07 MPa) and them ramp up linearly over about 1-3 seconds to a pressure of about 100-160 PSI (~0.7 MPa-1.1 MPa); the pressure may be held at the higher pressure for 1-3 seconds. In one embodiment, the pressure may be regulated with a ramping regulator or a solenoid with a small opening that acts as a pressure restrictor. Other variable pressure protocols and devices are within the scope of the present invention.

Illustratively, the polymeric sheets 200, 210 are cold formed in the forming die 218 to create the openings 240. The polymeric sheets 200, 210, which now include openings formed by the compressed fluid and the forming plates 220, 230, can be removed from the forming plates, and the manufacture of the pouch 100a, 100b can be completed by inserting a selection of one or more liquid and/or dried reagents, wash solutions, etc. into the correct blisters and chambers that have been formed.

Although the above-described method does not include heating the polymeric sheets 200, 210 prior to forming the sheets between the forming plates 220, 230, it is understood that the sheets may be heated to a softening temperature (e.g., a plastic transition temperature) prior to or during this process to aid formation of the desired shapes. For example, the sheets 200, 210 may be pressed between heating plates for heating prior to being pressed or clamped in the forming die 218. Illustratively, only selected portions of the sheets (e.g., some or all of the portions that will be reformed) may be heated, for example by pressing the sheets between heating plates having raised portions corresponding to the portions that will be subsequently reformed in the forming plates with the compressed fluid, as described above.

In one embodiment, liquid or aqueous reagents are injected into the reagent reservoirs 110 that are formed as described above. The aqueous reagents may be injected at the time of manufacture, or may be added later. Illustratively, the aqueous reagents are injected into the reagent reservoirs 104, 106, and 110a-110g, and the reservoirs are then sealed to seal in the aqueous reagents. In some embodiments, one or more of reservoirs 104, 106, and 110a-110g may include a dried reagent (e.g., a freeze-dried reagent pellet) that can be rehydrated at the time of use by a liquid reagent or by liquid sample. In some embodiments, liquid reagents may be spotted onto at least one of the first and second polymeric sheets 200, 210 and then dried prior to laminating the first and second polymeric sheets. Illustratively, fluids (e.g., sample preparation fluid in the sample preparation chamber, lysis buffer, etc.) may be injected into the corresponding openings (e.g., 243a-243j of FIG. 5A) that may be formed in the methods described herein.

Furthermore, a reaction card can be inserted into between the first and second polymeric sheets (e.g., sheets 200 and 210), such as is shown and described in U.S. Pat. Pub. No. 2020/0261914, the entirety of which was already incorporated herein by reference. For example, a reaction card 109 having a plurality of wells formed therein and spotted with one or more dried reagents for a second stage reaction can be inserted into a second reaction chamber 108 formed in the pouch 100a, 100b via an opening 244 between the first and second polymeric sheets. A first planar face of the reaction card may be bonded to the first polymeric sheet and a second, opposite planar face of the reaction card may be bonded to the second polymeric sheet. The opening through which the reaction card was inserted can be sealed by sealing the first polymeric sheet to the second polymeric sheet at the opening 244.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached invention disclosure for purposes of illustrating the invention, it will be apparent to those skilled in the art that various changes in the methods and apparatus disclosed herein may be made without departing from the scope of the invention, which is defined in the appended claims. All changes which come within the meaning and range of equivalency of the claims are to be embraced within their scope.

What is claimed is:

1. A method for forming a reaction container, comprising:
providing a polymeric sheet that comprises an inner planar face and an outer planar face;
contacting a first inner planar face of the polymeric sheet to a second inner planar face of the polymeric sheet;
pressing the polymeric sheet between a first forming plate and a second forming plate, wherein at least one of the first or second forming plates has one or more recesses for forming one or more features selected from the group consisting of a reaction chamber, a fluid flow channel, a reagent chamber, or a sample chamber in selected portions of the polymeric sheet;
propelling a compressed fluid between the inner planar faces of the polymeric sheet while the polymeric sheet is pressed between the forming plates to reform the selected portions of the polymeric sheet into a shape defined by the one or more recesses of the forming plates;
separating the first forming plate and the second forming plate so the polymeric sheet is no longer pressed between the first and second forming plates; and
removing the reaction container from between the first forming plate and the second forming plate, wherein the provided polymeric sheet comprises a first polymeric sheet and a second polymeric sheet, each polymeric sheet having an inner planar face and an outer planar face, and the method further comprising:

arranging the first and second polymeric sheets so that the inner planar faces are arranged adjacent to one another, performing the pressing step, and propelling a compressed fluid between the two polymeric sheets while the two polymeric sheets are pressed between the forming plates to reform the selected portions into a shape defined by the one or more recesses of the forming plates.

2. The method of claim 1, further comprising heating the polymeric sheet to a softening temperature prior to the pressing step, performing the pressing and propelling steps, and cooling the polymeric sheet after the propelling step to set the shape defined by the one or more recesses of the forming plates.

3. The method of claim 1, wherein the polymeric sheet comprises a flexible polymeric material having a thickness in a range of about 0.02 mm to about 0.1 mm.

4. The method of claim 3, wherein the flexible polymeric material is selected from the group consisting of polyester, polyethylene, polyethylene terephthalate (PET), polycarbonate, polypropylene (PP), polymethylmethacrylate, mixtures, combinations thereof.

5. The method of claim 4, wherein the flexible polymeric material comprises a water vapor and/or oxygen barrier.

6. The method of claim 5, wherein the flexible polymeric material with the water vapor and/or oxygen barrier has a water vapor transmission rate (WVTR) in a range of about 0.01 g/m2/24 hrs to about 3 g/m$^2$/24 hrs, preferably in a range of about 0.05 g/m2/24 hrs to about 2 g/m2/24 hrs, or more preferably no more than about 1 g/m2/24 hrs, and an oxygen transmission rate in a range of about 0.01 cc/m2/24 hrs to about 2 cc/m2/24 hrs, preferably in a range of about 0.05 cc/m2/24 hrs to about 2 cc/m2/24 hrs, or more preferably no more than about 1 cc/m2/24 hrs.

7. The method of claim 5, wherein the flexible polymeric material comprises two or more layers of film material bonded together and the water vapor and/or oxygen barrier comprises at least one of a metalized or ceramic-coated film layer.

8. The method of claim 1, wherein the selected portions reformed in the propelling step comprise one or more of a sample input chamber, a sample preparation chamber, a sample reactant recovery/wash chamber, a reaction chamber, or one or more fluid reagent reservoirs.

9. A method for forming a reaction container, comprising:
providing a first polymeric sheet and a second polymeric sheet, wherein the first and second polymeric sheets each comprise an inner planar face and an outer planar face;
contacting the inner planar face of the first polymeric sheet to the inner planar face of the second polymeric sheet;
laminating the first polymeric sheet to the second polymeric sheet;
making one or more seal lines joining the first and second polymeric sheets;
pressing the first and second polymeric sheets between a first forming plate and a second forming plate, wherein at least one of the first or second forming plates has one or more recesses positioned for reforming the first and second polymeric sheets to form one or more openings in a region defined by the one or more seal lines;
expanding selected areas of the first and second polymeric sheets into a shape defined by the one or more recesses of the forming plates by blowing a compressed gas between the first and second polymeric sheets while the first and second polymeric sheets are pressed between the forming plates;
separating the first forming plate and the second forming plate; and
removing the reaction container from between the first forming plate and the second forming plate.

10. The method of claim 9, wherein making the one or more seal lines comprises defining one or more of a sample input chamber, a sample preparation chamber, a sample reactant recovery/wash chamber, at least one reaction chamber, a one or more fluid reagent reservoirs, or one or more channels fluidically connecting the sample input chamber, the sample preparation chamber, the sample reactant recovery/wash chamber, the at least one reaction chamber, and the one or more reagent reservoirs.

11. The method of claim 10, wherein when the first and second polymeric sheets are pressed between a first forming plate and a second forming plate the one or more recesses of the forming plates substantially align with the one or more areas defined by the seal lines, and the selected areas expanded by blowing a compressed gas between the first and second polymeric sheets comprise one or more of the sample input chamber, the sample preparation chamber, the recovery/wash chamber, one or more reaction chambers, or one or more reagent reservoirs, and wherein one or more of the selected areas expanded by blowing the compressed gas between the first and second polymeric sheets are connected by one or more sealed, openable laminated channels.

12. The method of claim 11, further comprising:
making the one or more seal lines defining a second reaction chamber,
expanding the second reaction chamber into a shape defined by a second reaction chamber recess of the forming plates,
providing a reaction card having a plurality of wells formed therein and spotted with one or more dried reagents for a second stage reaction,
inserting the reaction card into the second reaction chamber via an opening between the first and second sheets;
bonding a first planar face of the reaction card to the first sheet and a second, opposite planar face of the reaction card to the second sheet, and
sealing the opening used to insert the reaction card by sealing the first polymeric sheet to the second polymeric sheet at the opening.

13. The method of claim 11, further comprising:
expanding a fluid reservoir and an access channel in the first reaction chamber into shapes defined by the recesses of the forming plates by blowing the compressed gas between the first and second polymeric sheets while the first and second polymeric sheets are pressed between the forming plates,
injecting an aqueous reagent into the fluid reservoir in the first reaction chamber via the access channel, and
sealing the sample preparation reagent in the fluid reservoir in the sample preparation chamber by sealing the first polymeric sheet to the second polymeric sheet at the access channel such that the reaction container is provided with the aqueous reagent in the first reaction chamber at the time of manufacture.

14. The method of claim 1, wherein the first and second polymeric sheets comprise a water vapor and/or oxygen barrier providing a water vapor transmission rate (WVTR) in a range of about 0.01 g/m2/24 hrs to about 3 g/m2/24 hrs, preferably in a range of about 0.05 g/m$^2$/24 hrs to about 2 g/m2/24 hrs, or more preferably no more than about 1 g/m2/24 hrs, and/or an oxygen transmission rate in a range of about 0.01 cc/m2/24 hrs to about 2 cc/m2/24 hrs, preferably in a range of about 0.05 cc/m2/24 hrs to about 2 cc/m2/24 hrs, or more preferably no more than about 1 cc/m2/24 hrs.

15. The method of claim 1, further comprising:
prior to the laminating step, dispensing droplets of one or more liquid reagents onto the first polymeric sheet or the second polymeric sheet and drying the droplets of liquid reagent dispensed onto the first polymeric sheet or the second polymeric sheet,
wherein the droplets of the one or more liquid reagents are dispensed and dried in one or more areas to be formed into the sample input chamber, the sample preparation chamber, the sample reactant recovery/wash chamber, the at least one reaction chamber, or the one or more channels fluidically connecting the sample input chamber, the sample preparation chamber, the sample reactant recovery/wash chamber, the at least one reaction chamber, and the one or more reagent reservoirs.

16. A method for forming a reaction container formed from a first sheet and a second sheet and having a reaction chamber, a reagent reservoir, a channel fluidically connecting the reaction chamber and the reagent reservoir, and one or more dried reagents disposed in the reaction container between the first sheet and the second sheet, the method comprising:
dispensing one or more liquid reagents onto the first sheet or the second sheet;
drying the liquid reagents dispensed onto the first sheet or the second sheet;
laminating the first sheet to the second sheet, wherein the laminating includes heating the first and second sheets and compressing them, and wherein the laminated first and second sheets are reversibly sealed to one another;
forming one or more seal lines substantially irreversibly bonding the first and second sheets together at the seal lines to define the reaction chamber, the reagent reservoir, and the channel;
clamping the first and second sheets in a forming die having a first plate and a second plate, wherein the forming die comprises a recess having a shape corresponding to the reagent reservoir;
propelling a fluid between the first and second sheets while the first and second sheets are clamped in the forming die to reform selected areas of the first and second sheets into the shapes of the recesses; and
removing the reaction container from the forming die.

17. The method of claim 16, wherein the liquid reagents are dispensed onto the first or second sheet as droplets.

18. The method of claim 16, wherein the liquid reagents are water-based.

19. The method of claim 16, wherein the liquid reagents are air dried on the first or second sheet prior to the laminating.

20. The method of claim 16, wherein the one or more liquid reagents are dispensed onto the first or second sheet and dried in a region to be formed into the reaction chamber.

21. The method of claim 16, further comprising injecting an aqueous fluid reagent into the reagent blister via an opening between the first and second sheets, sealing the fluid reagent in the reaction container by sealing the opening such that the reaction container is provided with the fluid reagent at the time of manufacture.

22. The method of claim 21, wherein the aqueous reagent is configured for rehydrating the one or more dried reagents disposed in the reaction container in preparation for or during performing an assay using the reaction container.

23. The method of claim 16, wherein the first sheet to the second sheet comprise a flexible polymeric material selected from the group consisting of polyester, polyethylene, polyethylene terephthalate (PET), polycarbonate, polypropylene (PP), polymethylmethacrylate, mixtures, combinations thereof, and further comprising a water vapor and/or oxygen barrier providing a water vapor transmission rate (WVTR) in a range of about 0.01 g/m2/24 hrs to about 3 g/m2/24 hrs, preferably in a range of about 0.05 g/m2/24 hrs to about 2 g/m2/24 hrs, or more preferably no more than about 1 g/m2/24 hrs, and an oxygen transmission rate in a range of about 0.01 cc/m2/24 hrs to about 2 cc/m2/24 hrs, preferably in a range of about 0.05 cc/m2/24 hrs to about 2 cc/m2/24 hrs, or more preferably no more than about 1 cc/m2/24 hrs.

24. The method of claim 16, wherein the liquid reagents dispensed onto the first or second sheet comprise an enzyme selected for use in a molecular biological or immunological assay.

25. The method of claim 24, wherein the enzyme regains its activity following the drying, laminating, and rehydration.

* * * * *